(12) United States Patent
Rosewarne

(10) Patent No.: US 9,532,054 B2
(45) Date of Patent: Dec. 27, 2016

(54) METHOD, APPARATUS AND SYSTEM FOR DE-BLOCKING VIDEO DATA

(71) Applicant: CANON KABUSHIKI KAISHA, Tokyo (JP)

(72) Inventor: Christopher James Rosewarne, Gosford (AU)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 14/145,249

(22) Filed: Dec. 31, 2013

(65) Prior Publication Data

US 2014/0192904 A1 Jul. 10, 2014

(30) Foreign Application Priority Data

Jan. 4, 2013 (AU) ................................ 2013200051

(51) Int. Cl.
*H04N 19/86* (2014.01)
(52) U.S. Cl.
CPC ........ *H04N 19/00909* (2013.01); *H04N 19/86* (2014.11)
(58) Field of Classification Search
CPC .................................. H04N 19/14; H04N 19/86
USPC ......................................................... 375/240
See application file for complete search history.

(56) References Cited

U.S. PATENT DOCUMENTS

2012/0141037 A1* 6/2012 Sato ..................... H04N 19/159
382/224
2013/0101024 A1* 4/2013 Van der Auwera .. H04N 19/117
375/240.03
2013/0259141 A1* 10/2013 Van der Auwera
........................ H04N 19/00909
375/240.29

OTHER PUBLICATIONS

B. Bross, W. Han, J. Ohm, G. Sullivan, and T. Wiegand High efficiency video coding (HEVC) text specification draft 6, JCTVC-H1003 (JCT-VC) of ITU-T SG16 WP3 and ISO/IEC JTC1/SC29/WG11,Feb. 1-10, 2012, pp. 1-248.*

(Continued)

*Primary Examiner* — Gims Philippe
*Assistant Examiner* — Ayman Abaza
(74) *Attorney, Agent, or Firm* — Canon USA, Inc. I.P. Division

(57) ABSTRACT

A method of de-blocking video data is disclosed. The video data encoding color channels in a 4:2:2 format is received. The video data is encoded in a quad-tree. A plurality of transform units is generated for one of the color channels, each of the transform units including at least one transform. A distance from an edge of one of the transform units to a boundary of a transform of the transform unit is determined. An edge flag for the transform unit is determined, the edge flag indicating the determined distance. De-blocking is applied to the transform units of the video data according to the determined edge flag.

10 Claims, 15 Drawing Sheets

(56) References Cited

OTHER PUBLICATIONS

Bross, B. et al., 'High efficiency video coding (HEVC) text specification draft 6', JCTVC-H1003 (JCT-VC) of ITU-T SG16 WP3 and ISO/IEC JTC1/SC291WG11, Feb. 1-10, 2012, pp. 1-248, [Retrieved from Internet on Jan. 23, 2015], <URL: http://phenix.int-evry.fr/jct/doc_end_user/documents/8_San%20Jose/wg11/JCTVC-H1003-v22.zip>.
Sullivan, Gary J. et al., 'Overview of the High Efficiency Video Coding (HEVC) Standard', IEEE Transactions on Circuits and Systems for Video Technology, vol. 22, No. 12, Dec. 2012, pp. 1649-1668.
Gisle Bjøntegaard, Extension for 4:2:2 and 4:4:4 YUV coding, Joint Video Team (JVT) of ISO/IEC MPEG & ITU-T VCEG, (ISO/IEC JTC1/SC29/WG11 and ITU-T SG16 Q.6), 8th Meeting: Geneva, Switzerland, May 23-27, 2003.

\* cited by examiner

METHOD, APPARATUS AND SYSTEM FOR DE-BLOCKING VIDEO DATA

REFERENCE TO RELATED PATENT APPLICATION(S)

This application claims the benefit under 35 U.S.C. §119 of the filing date of Australian Patent Application No. 2013200051, filed 4 Jan. 2013, hereby incorporated by reference in its entirety as if fully set forth herein.

TECHNICAL FIELD

The present invention relates generally to digital video signal processing and, in particular, to a method, apparatus and system for de-blocking a video frame of video data. The present invention also relates to a computer program product including a computer readable medium having recorded thereon a computer program for de-blocking a video frame of video data.

BACKGROUND

Many applications for video coding currently exist, including applications for transmission and storage of video data. Many video coding standards have also been developed and others are currently in development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has the goal of producing a new video coding standard to significantly outperform a presently existing video coding standard, known as "H.264/MPEG-4 AVC". The H.264/MPEG-4 AVC standard is itself a large improvement on previous video coding standards, such as MPEG-4 and ITU-T H.263. The new video coding standard under development has been named "high efficiency video coding (HEVC)". The Joint Collaborative Team on Video Coding JCT-VC is also considering implementation challenges arising from technology proposed for high efficiency video coding (HEVC) that create difficulties when scaling implementations of the standard to operate at high resolutions in real-time or high frame rates.

Video data is represented in one of several 'chroma formats', which specify the sample aspect ratio between a luma and multiple chroma channels of the video data. The aspect ratio implies a fixed relationship between collocated block sizes for luma and chroma for each chroma format. The fixed relationships also affect the available transform sizes used for the luma channel and chroma channels of a collocated block. When video data is represented using a "4:2:2" chroma format, a non-square relationship exists between the luma samples and the chroma samples. A consequence of this is that for a square block of luma samples, the collocated block of chroma samples will be rectangular in shape. Square transforms are normally used for the luma channel and desirably, square transforms are also used for the chroma channels. Transform boundaries may introduce visible artefacts into compressed video data, reducing the perceived quality of the frame. These artefacts tend to be visible along transform block boundaries, especially at low quality levels (i.e. at higher compression ratio or low bit-rates). One approach to removing, or minimising, the perceived impact of these artefacts is to use a 'de-blocking filter' to smooth discontinuities introduced at the transform boundaries.

SUMMARY

It is an object of the present invention to substantially overcome, or at least ameliorate, one or more disadvantages of existing arrangements.

According to one aspect of the present disclosure, there is provided a method of de-blocking video data, the method comprising:

receiving the video data encoding colour channels in a 4:2:2 format, the video data being encoded in a quad-tree;

generating a plurality of transform units for one of the colour channels, each of the transform units including at least one transform;

determining a distance from an edge of one of the transform units to a boundary of a transform of the transform unit;

determining an edge flag for the transform unit, the edge flag indicating the determined distance; and applying de-blocking to the transform units of the video data according to the determined edge flag.

According to another aspect of the present disclosure, there is provided a system for de-blocking video data, the system comprising:

a memory for storing data and a computer program;

a processor coupled to the memory for executing said computer program, said computer program comprising instructions for:

receiving the video data encoding colour channels in a 4:2:2 format, the video data being encoded in a quad-tree;

generating a plurality of transform units for one of the colour channels, each of the transform units including at least one transform;

determining a distance from an edge of one of the transform units to a boundary of a transform of the transform unit;

determining an edge flag for the transform unit, the edge flag indicating the determined distance; and applying de-blocking to the transform units of the video data according to the determined edge flag.

According to still another aspect of the present disclosure, there is provided an apparatus for de-blocking video data, the apparatus comprising:

means for receiving the video data encoding colour channels in a 4:2:2 format, the video data being encoded in a quad-tree;

means for generating a plurality of transform units for one of the colour channels, each of the transform units including at least one transform;

means for determining a distance from an edge of one of the transform units to a boundary of a transform of the transform unit;

means for determining an edge flag for the transform unit, the edge flag indicating the determined distance; and means for applying de-blocking to the transform units of the video data according to the determined edge flag.

According to still another aspect of the present disclosure, there is provided a computer readable medium comprising a computer program for de-blocking video data, the program comprising:

code for receiving the video data encoding colour channels in a 4:2:2 format, the video data being encoded in a quad-tree;

code for generating a plurality of transform units for one of the colour channels, each of the transform units including at least one transform;

code for determining a distance from an edge of one of the transform units to a boundary of a transform of the transform unit;

code for determining an edge flag for the transform unit, the edge flag indicating the determined distance; and code for applying de-blocking to the transform units of the video data according to the determined edge flag.

According to still another aspect of the present disclosure there is provided a method of de-blocking video data, the method comprising:

traversing a quad-tree hierarchy defined by one or more split coding unit flags or split transform flags;

determining a size of a transform in a chroma colour of the traversed quad-tree hierarchy;

determining an edge flag array location relative to a current location based on the determined size of the transform in the chroma colour channel;

storing an edge flag value at the determined edge flag array location, the edge flag value signalling that only a chroma edge is deblocked; and applying de-blocking to only the chroma edge according to the edge flag value.

According to still another aspect of the present disclosure there is provided an apparatus for de-blocking video data, the apparatus comprising:

means for traversing a quad-tree hierarchy defined by one or more split coding unit flags or split transform flags;

means for determining a size of a transform in a chroma colour of the traversed quad-tree hierarchy;

means for determining an edge flag array location relative to a current location based on the determined size of the transform in the chroma colour channel;

means for storing an edge flag value at the determined edge flag array location, the edge flag value signalling that only a chroma edge is deblocked; and means for applying de-blocking to only the chroma edge according to the edge flag value.

According to still another aspect of the present disclosure there is provided a system for de-blocking video data, the system comprising:

a memory for storing data and a computer program;

a processor coupled to the memory for executing the computer program, the computer program comprising instructions for:

traversing a quad-tree hierarchy defined by one or more split coding unit flags or split transform flags;

determining a size of a transform in a chroma colour of the traversed quad-tree hierarchy;

determining an edge flag array location relative to a current location based on the determined size of the transform in the chroma colour channel;

storing an edge flag value at the determined edge flag array location, the edge flag value signalling that only a chroma edge is deblocked; and applying de-blocking to only the chroma edge according to the edge flag value.

According to still another aspect of the present disclosure there is provided a computer readable medium having a computer program stored thereon for de-blocking video data, the program comprising:

code for traversing a quad-tree hierarchy defined by one or more split coding unit flags or split transform flags;

code for determining a size of a transform in a chroma colour of the traversed quad-tree hierarchy;

code for determining an edge flag array location relative to a current location based on the determined size of the transform in the chroma colour channel;

code for storing an edge flag value at the determined edge flag array location, the edge flag value signalling that only a chroma edge is deblocked; and code for applying de-blocking to only the chroma edge according to the edge flag value.

Other aspects are also disclosed.

BRIEF DESCRIPTION OF THE DRAWINGS

At least one embodiment of the present invention will now be described with reference to the following drawings and appendices, in which:

FIGS. 5A and 5B schematically illustrate chroma formats for representing frame data;

Figure 1:
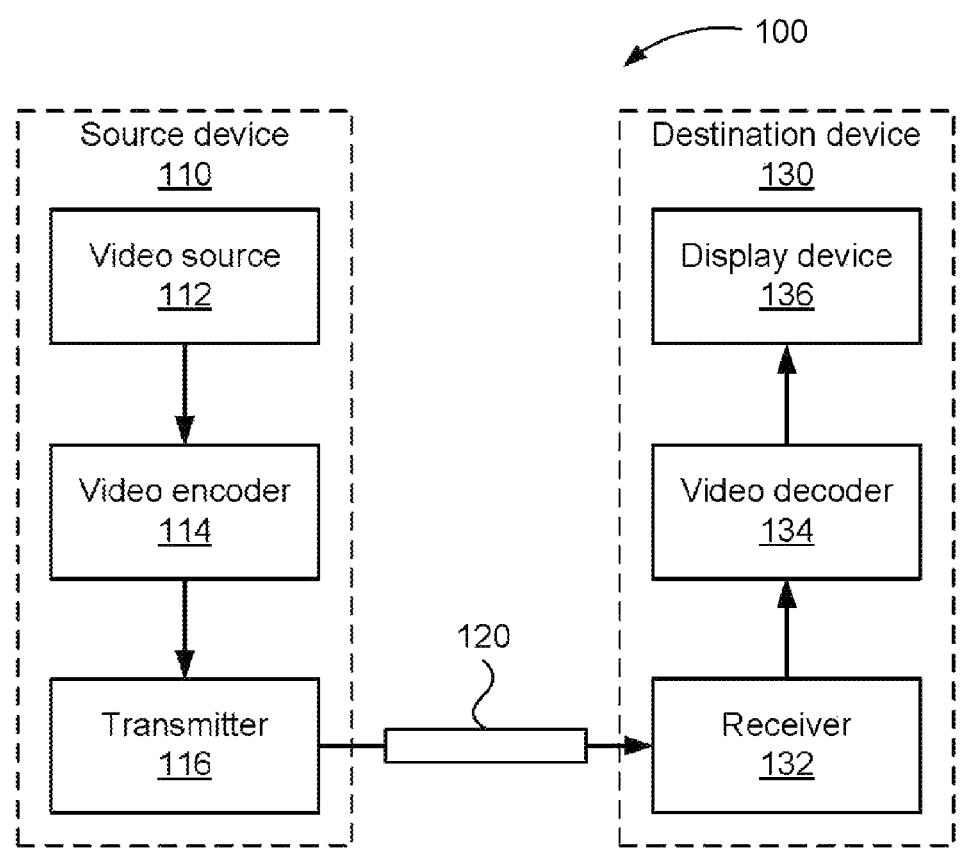
FIG. 1 is a schematic block diagram showing a video encoding and decoding system.

Appendix A shows an example of a de-blocking filter implementation;

Appendix B shows a further example of a de-blocking filter implementation; and

Appendix C shows a further example of de-blocking filter implementation.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

FIG. 1 is a schematic block diagram showing function modules of a video encoding and decoding system 100. The system 100 may utilise techniques for residual quad-tree transform selection that result in an improved selection of available transform logic for colour channels. The colour channels may include either chroma channel for all chroma formats supported by the system 100. The system 100 includes a source device 110 and a destination device 130. A communication channel 120 is used to communicate encoded video information from the source device 110 to the destination device 130. In some arrangements, the source device 110 and destination device 130 may comprise respective mobile telephone hand-sets, in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over the air television broadcasts, cable television applications, internet video applications and applications where encoded video is captured on some storage medium or a file server.

As shown in FIG. 1, the source device 110 includes a video source 112, a video encoder 114 and a transmitter 116. The video source 112 typically comprises a source of captured video frame data, such as an imaging sensor, a previously captured video sequence stored on a non-transitory recording medium, or a video feed from a remote imaging sensor. Examples of source devices 110 that may include an imaging sensor as the video source 112 include smart-phones, video camcorders and network video cameras. The video encoder 114 converts the captured frame data from the video source 112 into encoded video data and will be described further with reference to FIG. 3. The encoded video data is typically transmitted by the transmitter 116 over the communication channel 120 as encoded video data (or "encoded video information"). It is also possible for the encoded video data to be stored in some storage device, such as a "Flash" memory or a hard disk drive, until later being transmitted over the communication channel 120.

The destination device 130 includes a receiver 132, a video decoder 134 and a display device 136. The receiver 132 receives encoded video data from the communication channel 120 and passes received video data to the video decoder 134. The video decoder 134 then outputs decoded frame data to the display device 136. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device.

Figure 2A:
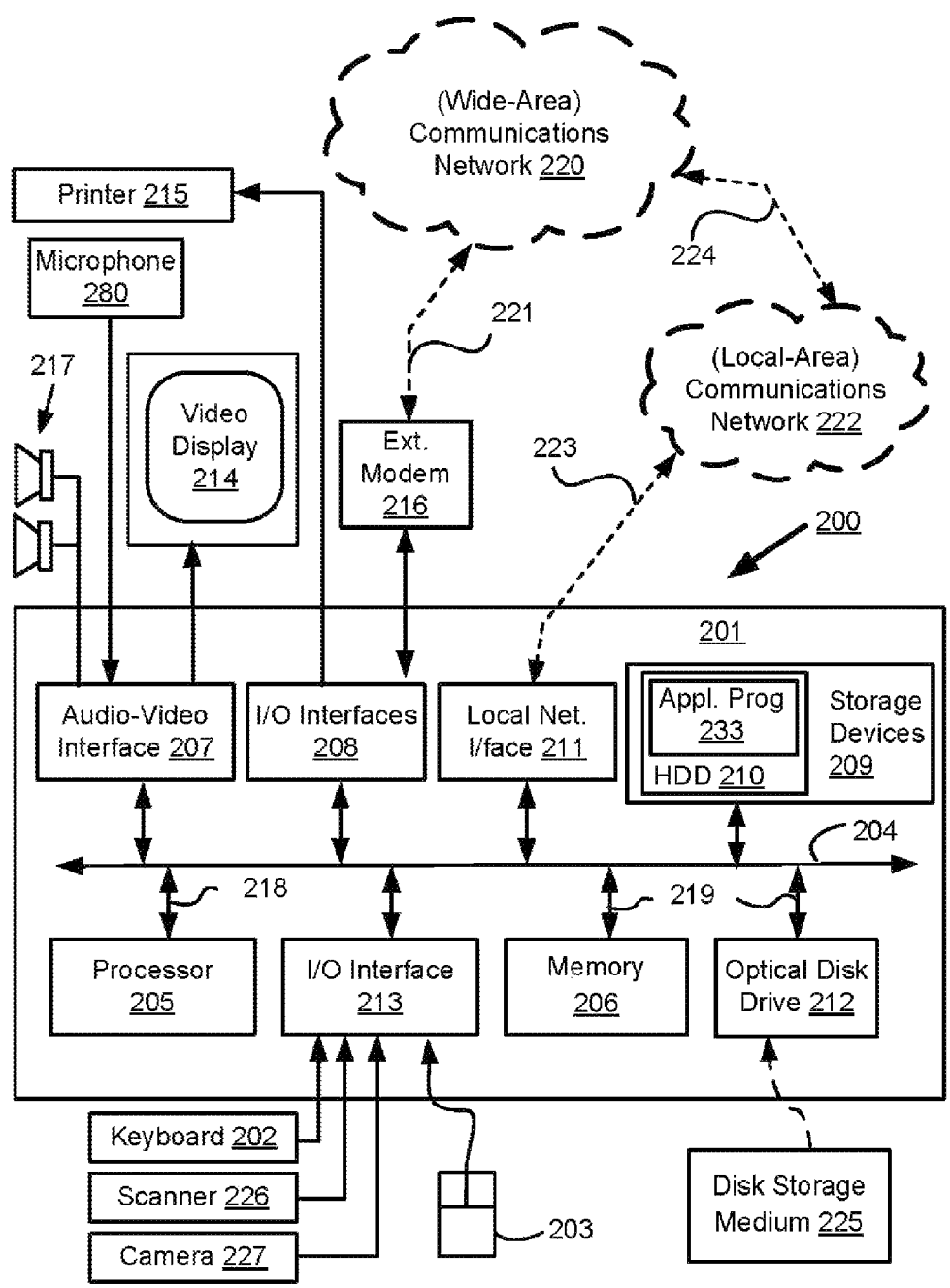
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and the processes of FIGS. 10 and 11, to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
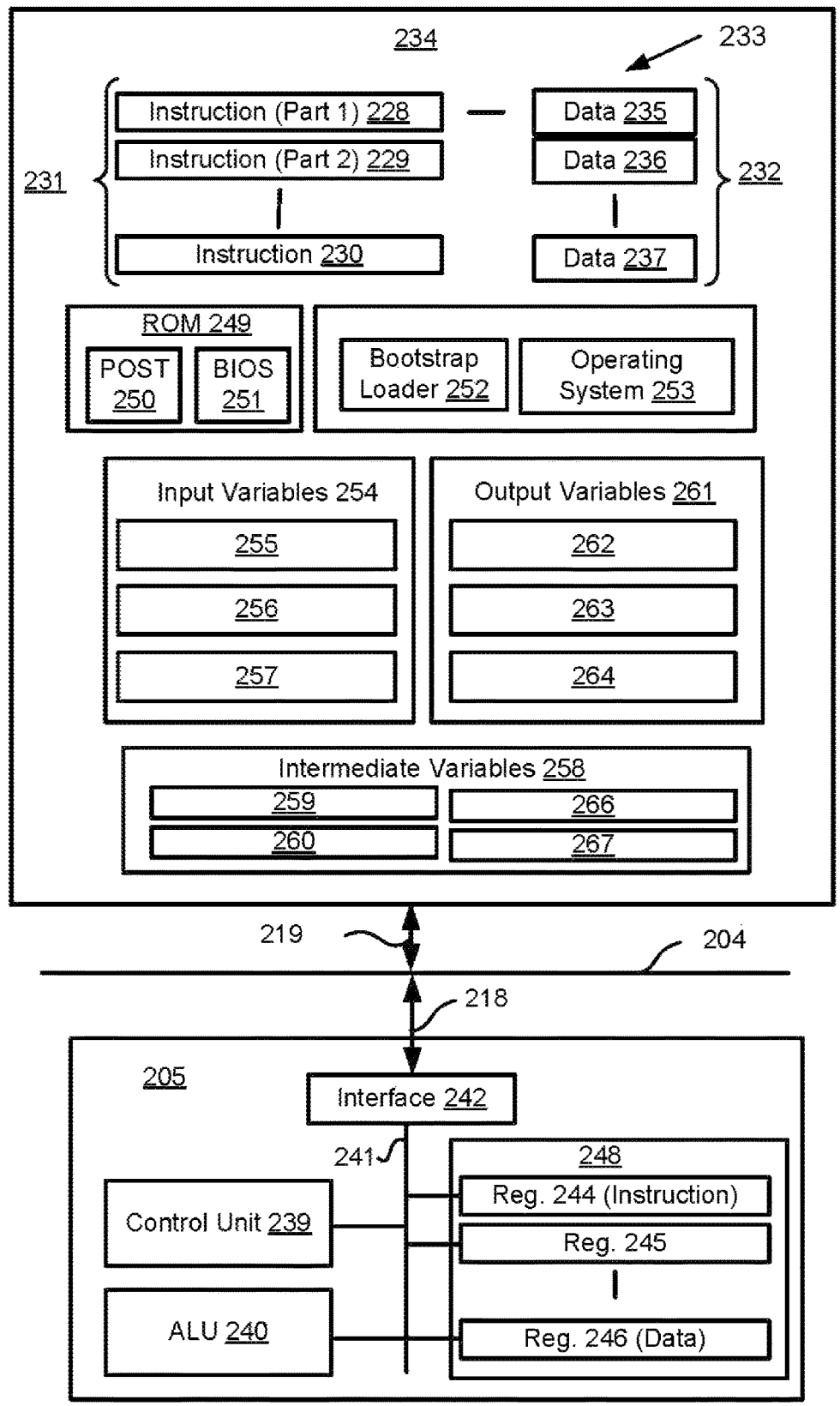

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 10 to 13 to be described is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3:
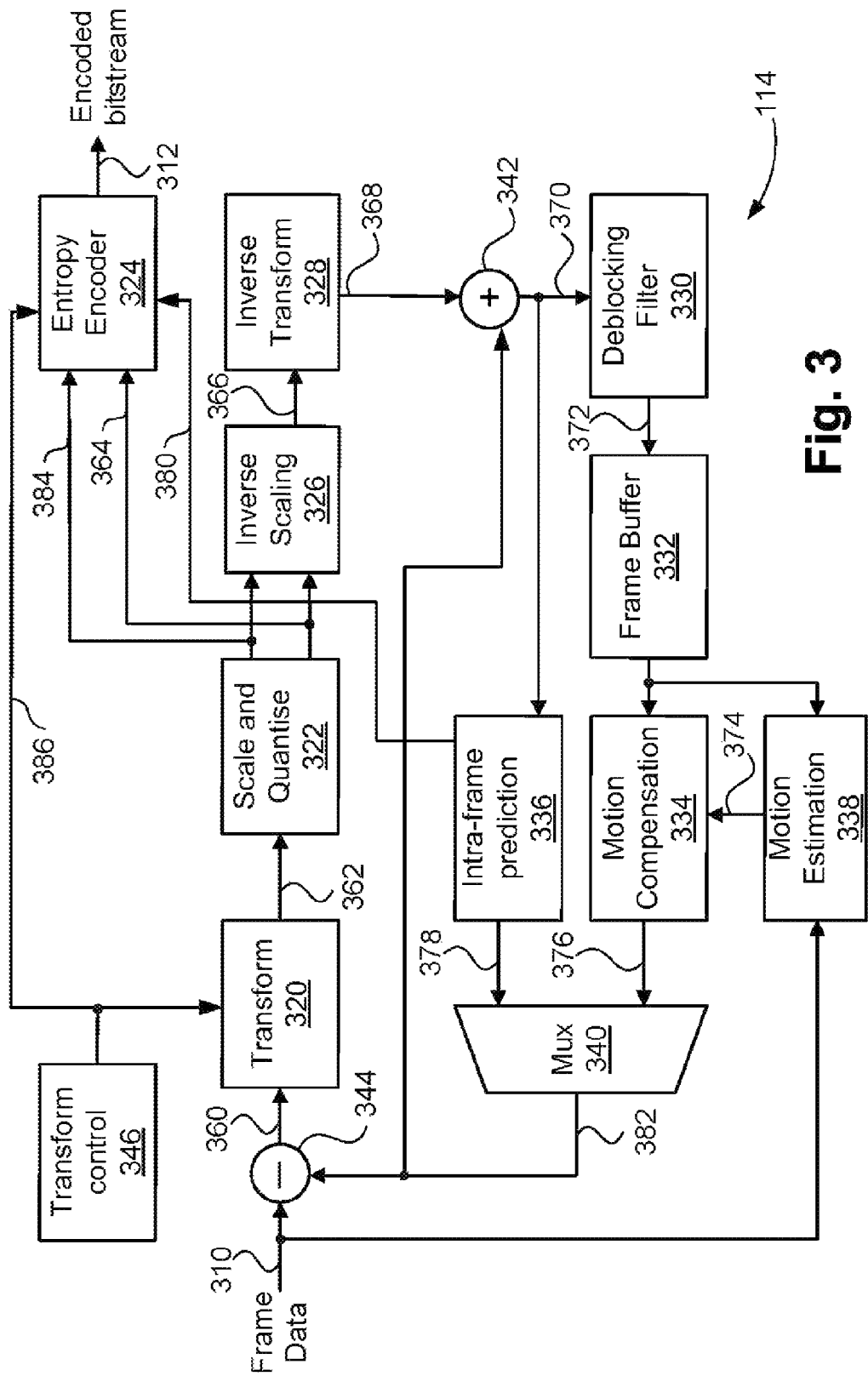
FIG. 3 is a schematic block diagram showing functional modules of a video encoder.
Figure 4:
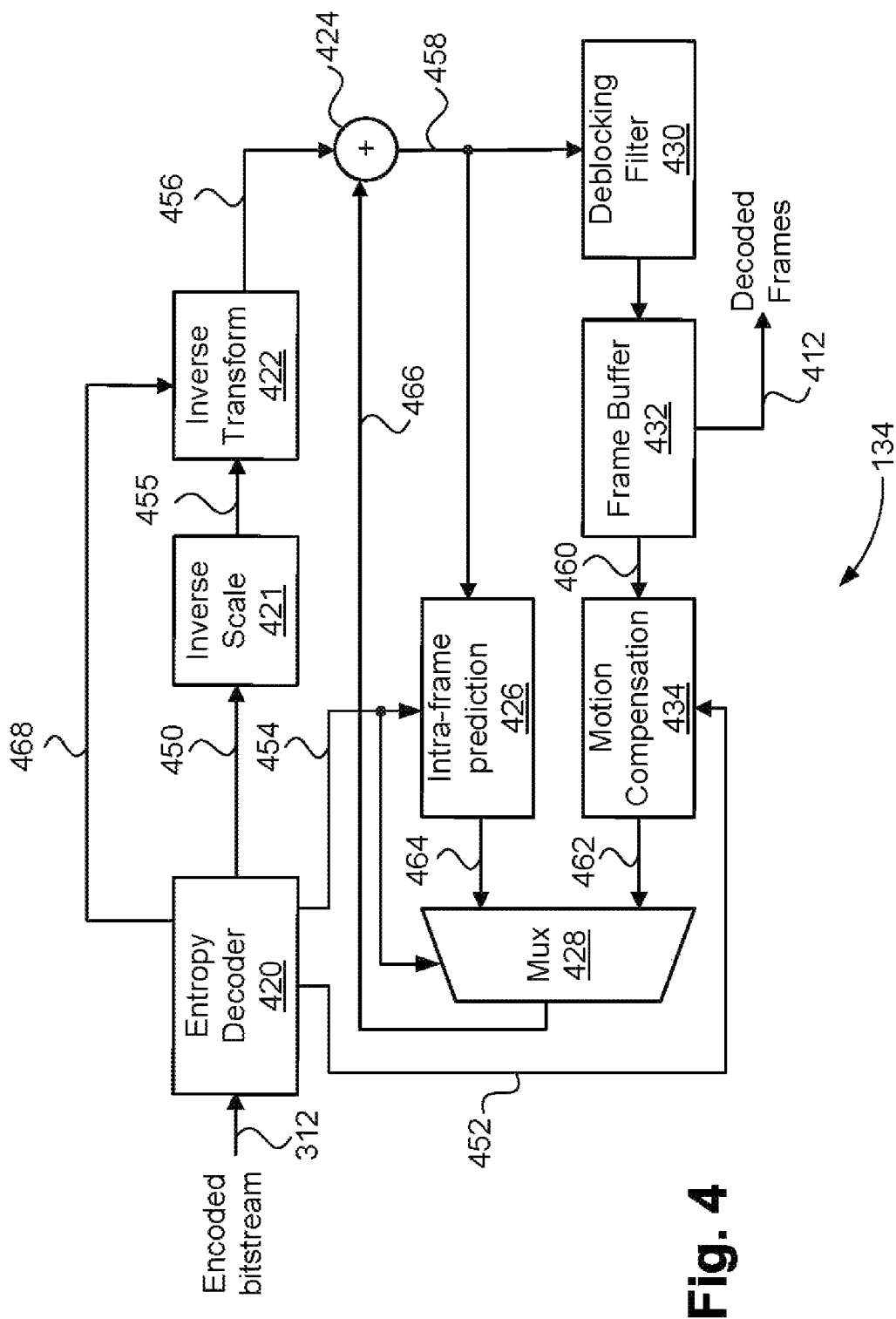
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205, or alternatively by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. In particular the video encoder 114 comprises modules 320-346 and the video decoder 134 comprises modules 420-434 which may each be implemented as one or more software code modules of the software application program 233.

Although the video encoder 114 of FIG. 3 is an example of a high efficiency video coding (HEVC) video encoding pipeline, other video codecs may also be used to perform the processing stages described herein. The video encoder 114 receives captured frame data, such as a series of frames, each frame including one or more colour channels. Each frame comprises one sample grid per colour channel. Colour information is represented using a 'colour space', such as recommendation ITU-R BT.709 ('YUV'), although other colour spaces are also possible. When a colour space, such as the YUV colour space, is used, the colour channels include a luma colour channel ('Y') and two chroma colour channels ('U' and 'V'). Moreover, differing amounts of information may be included in the sample grid of each colour channel of the captured frame data, depending on the sampling of the image or through application of filtering to resample the captured frame data. Several possible sampling methods, known as 'chroma formats' exist, some of which will be described with reference to FIGS. 5A and 5B.

The video encoder 114 divides each frame of the captured frame data, such as frame data 310, into regions generally referred to as 'coding tree blocks' (CTBs). Each coding tree block (CTB) includes a hierarchical quad-tree subdivision of a portion of the frame into a collection of 'coding units' (CUs). The coding tree block (CTB) generally occupies an area of 64×64 luma samples, although other sizes are possible, such as 16×16 or 32×32. In some cases even larger sizes for the coding tree block (CTB), such as 128×128 luma samples, may be used. The coding tree block (CTB) may be sub-divided via a split into four equal sized regions to create a new hierarchy level. Splitting may be applied recursively, resulting in a quad-tree hierarchy. As the coding tree block (CTB) side dimensions are always powers of two and the quad-tree splitting always results in a halving of the width and height, the region side dimensions are also always powers of two. When no further split of a region is performed, a 'coding unit' (CU) is said to exist within the region. When no split is performed at the top level (or typically the "highest level") of the coding tree block, the region occupying the entire coding tree block contains one coding unit (CU) that is generally referred to as a 'largest coding unit' (LCU). A minimum size also exists for each coding unit (CU), such as the area occupied by 8×8 luma samples, although other minimum sizes are also possible. Coding units of the minimum size are generally referred to as 'smallest coding units' (SCUs). As a result of the quad-tree hierarchy, the entirety of the coding tree block (CTB) is occupied by one or more coding units (CUs).

The video encoder 114 produces one or more arrays of data samples, generally referred to as 'prediction units' (PUs) for each coding unit (CU). Various arrangements of prediction units (PUs) in each coding unit (CU) are possible, with a requirement that the prediction units (PUs) do not overlap and that the entirety of the coding unit (CU) is occupied by the one or more prediction units (PUs). Such a requirement ensures that the prediction units (PUs) cover the entire frame area.

The video encoder 114 operates by outputting, from a multiplexer module 340, a prediction unit (PU) 382. A difference module 344 outputs the difference between the prediction unit (PU) 382 and a corresponding 2D array of data samples, in the spatial domain, from a coding unit (CU) of the coding tree block (CTB) of the frame data 310, the difference being known as a 'residual sample array' 360. The residual sample array 360 may be transformed into the frequency domain in a transform module 320. The residual sample array 360 from the difference module 344 is received by the transform module 320, which converts (or 'encodes') the residual sample array 360 from a spatial representation to a frequency domain representation by applying a 'forward transform'. The transform module 320 creates transform coefficients. The transform coefficients are configured as the residual transform array 362 for each transform in a transform unit (TU) in a hierarchical sub-division of the coding unit (CU). The coding unit (CU) is sub-divided into one or more transform units (TUs). The sub-divided coding unit (CU) may be referred to as a 'residual quad-tree' or a 'residual quad-tree (RQT)'. The sub-division of the residual data of the coding unit (CU) into a residual quad-tree (RQT) is performed under control of a transform control module 346.

The transform control module 346 may test the bit-rate required in the encoded bitstream 312 for various possible arrangements of transform units (TUs) in the residual quad-tree of a present coding unit (CU) according to a 'rate-distortion criterion'. The rate-distortion criterion is a measure of the acceptable trade-off between the bit-rate of the encoded bitstream 312, or a local region thereof, and the distortion, or difference between frames present in the frame buffer 332 and the captured frame data. In some arrangements, the rate-distortion criterion considers only the rate and distortion for luma and thus the encoding decision is made based only on characteristics of the luma channel. Generally, the residual quad-tree (RQT) is shared between luma and chroma, and the amount of chroma information is relatively small compared to luma, so considering luma only in the rate-distortion criterion is appropriate. In arrangements where decisions specific to chroma only need to be made, the rate-distortion criterion may be expanded to consider chroma bit costs and rate costs, or alternatively, a rule or 'heuristic' may be introduced in order to make a reasonable decision from chroma, based on the rate-distortion criterion decisions for luma. The transform control module 346 may thus select an arrangement of transform units (TUs) as the residual quad-tree. The selected arrangement is configured for encoding the residual sample array 360 of the present coding unit (CU) from a set of possible transform units (TUs). The configuration of the residual quad-tree (RQT) of the coding unit (CU) is specified by a set of split transform flags 386. The residual quad-tree (RQT) will be further discussed below, with reference to FIGS. 5A and 5B.

The set of possible transform units (TUs) for a residual quad-tree is dependent on the available transform sizes and coding unit (CU) size. In one arrangement, the residual quad-tree results in a lower bit-rate in the encoded bitstream 312, thus achieving higher compression efficiency. A larger sized transform unit (TU) results in use of larger transforms for both luma and chroma. Generally, larger transforms provide a more compact representation of a residual sample array with sample data (or 'residual energy') spread across the residual sample array. Smaller transform units (TUs) provide a more compact representation of a residual sample array with residual energy localised to specific regions of the residual sample array. Thus, the many possible configurations of the residual quad-tree provides a useful means for achieving high coding efficiency of the residual sample array 360 in the high efficiency video coding (HEVC) standard under development.

For the high efficiency video coding (HEVC) standard under development, conversion of the residual sample array 360 to the frequency domain representation is implemented using a modified discrete cosine transform (DCT), in which a DCT is modified to be implemented using shifts and additions. Various sizes of the residual sample array 360 and the transform coefficients 362 are possible, in accordance with supported transform sizes. In the high efficiency video coding (HEVC) standard under development, transforms are performed on 2D arrays of data samples having sizes, such as 32×32, 16×16, 8×8 and 4×4. Thus, a predetermined set of transform sizes are available to the video encoder 114. Moreover, the set of transform sizes may differ between the luma channel and the chroma channels.

Two-dimensional transforms are generally configured to be 'separable', enabling implementation as a first set of 1D transforms operating on the 2D array of data samples in one direction (e.g. on rows). The first set of 1D transforms is followed by a second set of 1D transform operating on the 2D array of data samples output from the first set of 1D transforms in the other direction (e.g. on columns) Transforms having the same width and height are generally referred to as 'square transforms'. Additional transforms, having differing widths and heights may also be used and are generally referred to as 'non-square transforms'. In some arrangements, the row and column one-dimensional transforms may be combined into specific hardware or software modules, such as a 4×4 transform module or an 8×8 transform module.

Transforms having larger dimensions require larger amounts of circuitry to implement, even though such larger dimensioned transforms may be infrequently used. Accordingly, the high efficiency video coding (HEVC) standard under development defines a maximum transform size of 32×32 luma samples. The integrated nature of the transform implementation defined for the high efficiency video coding (HEVC) standard under development also introduces a preference to reduce the number of non-square transform sizes supported. Such non-square transform sizes typically require either entirely new hardware to be implemented for each non-square transform size or require additional selection logic to enable reconfiguration of various 1D transform logic into a particular non-square transform size. Additionally, such non-square transform sizes may also increase the complexity of software implementations by introducing additional methods to perform transform and inverse transform operations for each supported non-square transform size, and increasing complexity to implement the necessary buffer management functionality of the additional transform sizes.

Transforms may be applied to both the luma and chroma channels. Differences between the handling of luma and chroma channels with regard to transform units (TUs) exist and will be discussed below with reference to FIGS. 5A and 5B. Each residual quad-tree occupies one coding unit (CU) and is defined as a quad-tree decomposition of the coding unit (CU) into a hierarchy including one transform unit (TU) at each leaf node of the residual quad-tree hierarchy, with each transform unit (TU) able to make use of specific transforms of the supported transform sizes. Similarly to the coding tree block (CTB), it is necessary for the entirety of the coding unit (CU) to be occupied by one or more transform units (TUs). At each level of the residual quad-tree hierarchy a 'coded block flag value' signals possible presence of a transform in each colour channel, either at the present hierarchy level (when no further splits are present), or to signal that lower hierarchy levels may contain at least one transform among the resulting transform units (TUs). When the coded block flag value is zero, all residual coefficients at the present or lower hierarchy levels are known to be zero and thus no transform is required to be performed for the corresponding colour channel of any transform units (TU) of the residual quad-tree (either at the present hierarchical level or at lower hierarchical levels). When the coded block flag value is one, if the present region is not further sub-divided then the region contains a transform which requires at least one non-zero residual coefficient. If the present region is further sub-divided, a coded block flag value of one indicates that each resulting sub-divided region may include non-zero residual coefficients. In this manner, for each colour channel, zero or more transforms may cover a portion of the area of the coding unit (CU) varying from none up to the entirety of the coding unit (CU). Separate coded block flag values exist for each colour channel. Each coded block flag value is not required to be encoded, as cases exist where there is only one possible coded block flag value.

The transform coefficients 362 are input to the scale and quantise module 322 where data sample values thereof are scaled and quantised, according to a determined quantisation parameter 384, to produce a residual data array 364. The scale and quantisation results in a loss of precision, dependent on the value of the determined quantisation parameter 384. A higher value of the determined quantisation parameter 384 results in greater information being lost from the residual data. The lost information increases the compression achieved by the video encoder 114 at the expense of reducing the visual quality of output from the video decoder 134. The determined quantisation parameter 384 may be adapted during encoding of each frame of the frame data 310. Alternatively, the determined quantisation parameter 384 may be fixed for a portion of the frame data 310. In one arrangement, the determined quantisation parameter 384 may be fixed for an entire frame of frame data 310. Other adaptations of the determined quantisation parameter 384 are also possible, such as quantising different residual coefficients with separate values.

The residual data array 364 and determined quantisation parameter 384 are taken as input to an inverse scaling module 326. The inverse scaling module 326 reverses the scaling performed by the scale and quantise module 322 to produce resealed data arrays 366, which are resealed versions of the residual data array 364. The residual data array 364, the determined quantisation parameter 384 and the split transform flags 386 are also taken as input to an entropy encoder module 324. The entropy encoder module 324 encodes the values of the residual data array 364 in an encoded bitstream 312 (or 'video bitstream'). Due to the loss of precision resulting from the scale and quantise module 322, the resealed data arrays 366 are not identical to the original values in the array 363. The resealed data arrays 366 from the inverse scaling module 326 are then output to an inverse transform module 328. The inverse transform module 328 performs an inverse transform from the frequency domain to the spatial domain to produce a spatial-domain representation 368 of the resealed transform coefficient arrays 366. The spatial-domain representation 368 is substantially identical to a spatial domain representation that is produced at the video decoder 134. The spatial-domain representation 368 is then input to a summation module 342.

A motion estimation module 338 produces motion vectors 374 by comparing the frame data 310 with previous frame data from one or more sets of frames stored in a frame buffer module 332, generally configured within the memory 206. The sets of frames are known as 'reference picture lists'. The motion vectors 374 are then input to a motion compensation module 334 which produces an inter-predicted prediction unit (PU) 376 by filtering data samples stored in the frame buffer module 332, taking into account a spatial offset derived from the motion vectors 374. Not illustrated in FIG. 3, the motion vectors 374 are also passed as syntax elements to the entropy encoder module 324 for encoding in the encoded bitstream 312. The intra-frame prediction module 336 produces an intra-predicted prediction unit (PU) 378 using samples 370 obtained from the summation module 342, which sums the prediction unit (PU) 382 from the multiplexer module 340 and the spatial domain output of the multiplexer 369. The intra-frame prediction module 336 also produces an intra-prediction mode 380 which is sent to the entropy encoder 324 for encoding into the encoded bitstream 312.

Prediction units (PUs) may be generated using either an intra-prediction or an inter-prediction method. Intra-prediction methods make use of data samples adjacent to the prediction unit (PU) that have previously been decoded (typically above and to the left of the prediction unit) in order to generate reference data samples within the prediction unit (PU). Various directions of intra-prediction are possible, referred to as the 'intra-prediction mode'. Inter-prediction methods make use of a motion vector to refer to a block from a selected reference frame. The motion estimation module 338 and motion compensation module 334 operate on motion vectors 374, having a precision of one eighth (⅛) of a luma sample, enabling precise modelling of motion between frames in the frame data 310. The decision on which of the intra-prediction or the inter-prediction method to use is made according to a rate-distortion trade-off between desired bit-rate of the resulting encoded bitstream 312 and the amount of image quality distortion introduced by either the intra-prediction or inter-prediction method. If intra-prediction is used, one intra-prediction mode is selected from the set of possible intra-prediction modes, also according to a rate-distortion trade-off. The multiplexer module 340 selects either the intra-predicted reference samples 378 from the intra-frame prediction module 336, or the inter-predicted prediction unit (PU) 376 from the motion compensation block 334, depending on the decision made by a rate distortion algorithm.

The summation module 342 produces a sum 370 that is input to a de-blocking filter module 330. The de-blocking filter module 330 performs filtering along block boundaries, producing de-blocked samples 372 that are written to the frame buffer module 332 configured within the memory 206. The frame buffer module 332 is a buffer with sufficient capacity to hold data from one or more past frames for future reference as part of a reference picture list.

For the high efficiency video coding (HEVC) standard under development, the encoded bitstream 312 produced by the entropy encoder 324 is delineated into network abstraction layer (NAL) units. Generally, each slice of a frame is contained in one NAL unit. The entropy encoder 324 encodes the residual array 364, the intra-prediction mode 380, the motion vectors and other parameters, collectively referred to as 'syntax elements', into the encoded bitstream 312 by performing a context adaptive binary arithmetic coding (CABAC) algorithm. Syntax elements are grouped together into 'syntax structures'. The groupings may contain recursion to describe hierarchical structures. In addition to ordinal values, such as an intra-prediction mode or integer values, such as a motion vector, syntax elements also include flags, such as to indicate a quad-tree split.

Although the video decoder 134 of FIG. 4 is described with reference to a high efficiency video coding (HEVC) video decoding pipeline, other video codecs may also employ the processing stages of modules 420-434. The encoded video information may also be read from memory 206, the hard disk drive 210, a CD-ROM, a Blu-Ray™ disk or other computer readable storage medium. Alternatively the encoded video information may be received from an external source, such as a server connected to the communications network 220 or a radio-frequency receiver.

As seen in FIG. 4, received video data, such as the encoded bitstream 312, is input to the video decoder 134. The encoded bitstream 312 may be read from memory 206, the hard disk drive 210, a CD-ROM, a Blu-Ray™ disk or other computer readable storage medium. Alternatively the encoded bitstream 312 may be received from an external source such as a server connected to the communications network 220 or a radio-frequency receiver. The encoded bitstream 312 contains encoded syntax elements representing the captured frame data to be decoded.

The encoded bitstream 312 is input to an entropy decoder module 420 which extracts the syntax elements from the encoded bitstream 312 and passes the values of the syntax elements to other blocks in the video decoder 134. The entropy decoder module 420 applies the context adaptive binary arithmetic coding (CABAC) algorithm to decode syntax elements from the encoded bitstream 312. The decoded syntax elements are used to reconstruct parameters within the video decoder 134. Parameters include zero or more residual data array 450, motion vectors 452, a prediction mode 454 and split transform flags 468. The residual data array 450 is passed to an inverse scale module 421, the motion vectors 452 are passed to a motion compensation module 434, and the prediction mode 454 is passed to an intra-frame prediction module 426 and to a multiplexer 428. The inverse scale module 421 performs inverse scaling on the residual data to create reconstructed data 455 in the form of transform coefficients. The inverse scale module 421 outputs the reconstructed data 455 to an inverse transform module 422. The inverse transform module 422 applies an 'inverse transform' to convert (or 'decode') the reconstructed data 455 (i.e., the transform coefficients) from a frequency domain representation to a spatial domain representation, outputting a residual sample array 456 via a multiplexer module 423. The inverse transform module 422 performs the same operation as the inverse transform module 328. The inverse transform module 422 is configured to perform transforms in accordance with the residual quad-tree specified by the split transform flags 468. The transforms performed by the inverse transform module 422 are selected from a predetermined set of transform sizes required to decode an encoded bitstream 312 that is compliant with the high efficiency video coding (HEVC) standard under development.

The motion compensation module 434 uses the motion vectors 452 from the entropy decoder module 420, combined with reference frame data 460 from a frame buffer block 432, configured within the memory 206, to produce an inter-predicted prediction unit (PU) 462 for a prediction unit (PU), being a prediction of output decoded frame data. When the prediction mode 454 indicates that the current prediction unit was coded using intra-prediction, the intra-frame prediction module 426 produces an intra-predicted prediction unit (PU) 464 for the prediction unit (PU) using data samples spatially neighbouring the prediction unit (PU) and a prediction direction also supplied by the prediction mode 454. The spatially neighbouring data samples are obtained from a sum 458, output from a summation module 424. The multiplexer module 428 selects the intra-predicted prediction unit (PU) 464 or the inter-predicted prediction unit (PU) 462 for a prediction unit (PU) 466, depending on the current prediction mode 454. The prediction unit (PU) 466, which is output from the multiplexer module 428, is added to the residual sample array 456 from the inverse scale and transform module 422 by the summation module 424 to produce sum 458. The sum 458 is then input to each of a de-blocking filter module 430 and the intra-frame prediction module 426. The de-blocking filter module 430 performs filtering along data block boundaries, such as transform unit (TU) boundaries, to smooth visible artefacts. The output of the de-blocking filter module 430 is written to the frame buffer module 432 configured within the memory 206. The frame buffer module 432 provides sufficient storage to hold one or more decoded frames for future reference. Decoded frames 412 are also output from the frame buffer module 432 to a display device, such as the display device 136 (e.g., in the form of the display device 214).

FIG. 5A shows a sample grid of a frame portion 500 encoded using a 4:2:0 chroma format. FIG. 5B shows a frame portion 510 encoded using a 4:2:2 chroma format. The chroma format is specified as a configuration parameter to the video encoder 114 and the video encoder 114 encodes a 'chroma_format_idc' syntax element into the encoded bitstream 312 that specifies the chroma format. The video decoder 134 decodes the 'chroma_format_idc' syntax element from the encoded bitstream 312 to determine the chroma format in use. For example, when a 4:2:0 chroma format is in use, the value of chroma_format_idc is one (1), when a 4:2:2 chroma format is in use, the value of chroma_format_idc is two (2) and when a 4:4:4 chroma format is in use, the value of chroma_format_idc is three (3). In FIGS. 5A and 5B, luma sample locations, such as a luma sample location 501, are illustrated using 'X' symbols, and chroma sample locations, such as a chroma sample location 502, are illustrated using 'O' symbols. By sampling the frame portion 500 at the points indicated, a sample grid is obtained for each colour channel when a 4:2:0 chroma format is applied. At each luma sample location X, the luma channel ('Y') is sampled, and at each chroma sample location O, both the chroma channels ('U' and 'V') are sampled. As shown in FIG. 5A, for each chroma sample location, a 2×2 arrangement of luma sample locations exists.

By sampling the luma samples at the luma sample locations and chroma samples at the chroma sample locations indicated in the frame portion 510, a sample grid is obtained for each colour channel when a 4:2:2 chroma format is applied. The same allocation of data samples to colour channels is made for the frame portion 510 as for the frame portion 500. In contrast to the frame portion 500, twice as many chroma sample locations exist in frame portion 510. In frame portion 510 the chroma sample locations are collocated with every second luma sample location. Accordingly, in FIG. 5B, for each chroma sample location, an arrangement of 2×1 luma sample locations exists.

Various allowable dimensions of transform units were described above in units of luma samples. The region covered by a transform applied for the luma channel will thus have the same dimensions as the transform unit dimensions. As the transform units also encode chroma channels, the applied transform for each chroma channel will have dimensions adapted according to the particular chroma format in use. For example, when a 4:2:0 chroma format is in use, a 16×16 transform unit (TU) will use a 16×16 transform for the luma channel, and an 8×8 transform for each chroma channel.

When a 4×4 transform is used for the luma channel there is no corresponding 2×2 transform available (i.e., when the 4:2:0 chroma format is applied) or 4×2 transform available (i.e., when the 4:2:2 chroma format is applied) that could be used for the chroma channels. In such an arrangement, a 4×4 transform for each chroma channel may cover the region occupied by multiple luma transforms. When a 4:4:4 chroma format is in use, described arrangements may use the same transform size for the luma channel and each chroma channel. When a 4:2:2 chroma format is in use, the chroma region of a given transform unit (TU) is rectangular, having the same height as the luma region but half the width, due to the 2×1 sample aspect ratio for each chroma sample. As such, the chroma region always has a 1×2 aspect ratio and possible sizes include 4×8, 8×16 and 16×32, although other sizes are also possible. Arrangements that only support square transforms may divide the rectangular chroma region into two equally-sized square regions and may use a square transform each of the resulting regions. The division of a rectangular chroma region, having a 1×2 aspect ratio, into two equally-sized square regions may be referred to as a 'vertical split' or an 'inferred split'. This split may be considered a 'vertical split' because the rectangular chroma region is vertically split into two halves, resulting in two square regions. This split may also be considered an 'inferred split' because no signalling is required in the encoded bitstream 312 to signal that the split occurs. Note that a 'vertical split' results in additional horizontal boundaries between the resulting square regions. The particular transform sizes used in the luma channel and in each chroma channel is dependent on the coding unit (CU) size, the residual quad-tree (RQT) and the chroma format in use.

Although a 4:4:4 chroma format may result in use of a 32×32 transform for each chroma channel, the transform size is not used in the 4:2:2 chroma format or the 4:2:0 chroma format, where the maximum possible transform size is limited to 16×16, due to the overall maximum size limit of 32×32. Although the video encoder 114 and the video decoder 134 are described independently of differences between the luma and chroma channels, the differing sample grids resulting from the chroma formats necessitates the need for differences in the video encoder 114 and video decoder 134. In one arrangement, the video encoder 114 and video decoder 134 may have separate 'processing paths' for the luma channel and for the chroma channels. An arrangement where the video encoder 114 and video decoder 134 have separate 'processing paths' may thus decouple processing of luma samples and chroma samples. As the encoded bitstream 312 is a single bitstream for both the luma and chroma channels, the entropy encoder 324 and the entropy decoder 420 are not decoupled. Additionally, a single frame buffer, such as the frame buffers 332/432 hold luma and chroma samples and are thus not decoupled. For arrangements where the video encoder 114 and video decoder 134 have separate 'processing paths', the modules 322-330 and 334-340 and the modules 422-430 and 434 may have luma and chroma processing decoupled, resulting in a 'luma processing path' and a 'chroma processing path'.

Arrangements supporting the 4:4:4 chroma format require 32×32 transform logic in the chroma processing path and such transform logic is not used in either 4:2:2 or 4:2:0 chroma formats. Arrangements supporting the 4:2:2 chroma format and the 4:4:4 chroma format therefore have transform logic present in the chroma processing path that was only used for the 4:4:4 chroma format, even though benefit may be achieved by using the transform logic for the 4:2:2 chroma format.

The 'residual quad-tree' (RQT) defines a hierarchy that begins at a 'root node', covering a region containing one or more transform units (TUs) at each 'leaf node' of the hierarchy. At non-leaf nodes the region is divided into four equally-sized 'sub-regions', in a split known as a 'quad-tree split'. Each transform unit (TU) has an associated size (or 'transform size'), generally described as the dimensions of the region containing the transform unit (TU) on the luma sample grid, although the region may also be described as dimensions on the chroma sample grid. The size is dependent on the coding unit (CU) size and the transform depth. Transform units (TUs) with a transform depth of zero have a size equal to the size of the corresponding coding unit (CU). Each increment of the transform depth results in a halving of the dimensions (i.e the side width and height) of transform units (TUs) present in the residual quad-tree at the given transform depth. As the frame includes a luma channel and chroma channels, the coding unit (CU) occupies a region on both the luma sample grid and the chroma sample grid and thus each transform unit (TU) includes information describing both the luma samples on the luma sample grid and the chroma samples on the chroma sample grid. The nature of the information for each transform unit (TU) is dependent on the processing stage of the video encoder 114 or the video decoder 134. At the input to the transform module 320 and the output of the inverse scale and transform module 422, the residual sample array 360 and 456, respectively, contain information for each transform unit (TU) in the spatial domain. The residual sample arrays 360 and 456 may be further divided into a 'chroma residual sample array' and a 'luma residual sample array', due to differences in processing between the luma channel and the chroma channels. At the output of the scale and quantise module 322 and the input of the inverse scale and transform module 422, the residual data array 364 and 450 respectively contain information for each transform unit (TU) in the frequency domain. The residual data arrays 364 and 450 may be further divided into a 'chroma residual data array' and a 'luma residual data array', due to differences in processing between the luma channel and the chroma channels.

Figure 6:
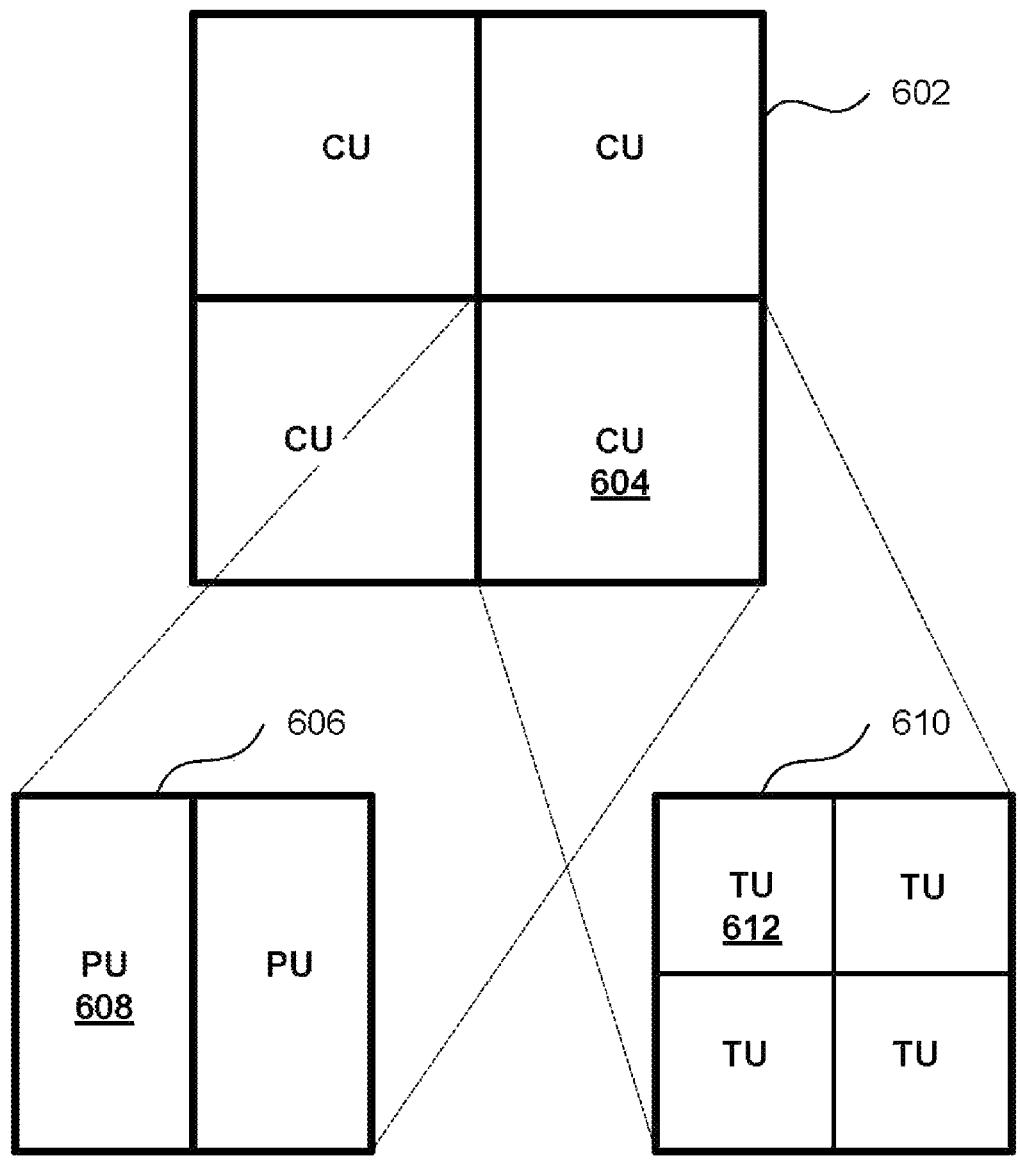
FIG. 6 schematically illustrates a subdivision of a coding tree unit (CTB) into multiple coding units (CUs), prediction units (PUs) and transform units (TUs)

FIG. 6 schematically illustrates a subdivision of a coding tree block (CTB) 602 into multiple coding units (CUs), prediction units (PUs) and transform units (TUs). A quad-tree hierarchy describes the division of a coding tree block (CTB), such as the coding tree block (CTB) 602, into one or more coding units (CUs). The quad-tree hierarchy is defined by one or more 'split coding unit flags' (or 'split_cu_flag' syntax elements) present in the encoded bitstream 312.

In FIG. 6, the coding tree block (CTB) 602 is divided into four equally-sized square regions, each of which is not further sub-divided. Consequently, the coding tree block (CTB) 602 contains four coding units (CUs), such as coding unit (CU) 604. Each coding unit (CU) includes one or more prediction units (PUs) and one or more transform units (TUs).

The decomposition of a coding unit (CU) into one or more prediction units (PUs) is referred to as a 'partitioning' and is generally specified by a 'partition mode' (or 'part_mode' syntax element) present in the encoded bitstream 312. The partition mode may specify that a single prediction unit (PU) occupy the entire coding unit (CU), or that multiple non-overlapping prediction units (PUs) occupy the entire coding unit (CU). For example, as seen in FIG. 6, the coding unit (CU) 604 includes a partitioning 606 that divides the area of the coding unit (CU) 604 into two rectangular prediction units (PUs), such as prediction unit (PU) 608.

Each inter-predicted prediction unit (PUs) has a motion vector and each intra-predicted prediction unit (PU) has a direction. Consequently, visual discontinuities are possible at the boundary between adjacent prediction units (PUs) due to different motion vector(s), direction(s) or combination of different motion vector(s) and direction(s). For a given partitioning, one or more resulting prediction units (PUs) are either all intra-predicted or all inter-predicted, but not a combination of intra-prediction and inter-prediction.

The decomposition of a coding unit (CU) into one or more transform units (TUs) is a quad-tree decomposition that is referred to as a 'residual quad-tree' (RQT). A residual quad-tree (RQT) is generally specified by one or more 'split transform flags' (or 'split_transform_flag' syntax elements) present in the encoded bitstream 312. For example, the coding unit (CU) 604 includes a residual quad-tree (RQT) 610 that divides the area of the coding unit (CU) 604 into four equal-sized regions. Each of the four equal-sized regions is not further sub-divided, resulting in four transform units (TUs), such as transform unit (TU) 612. Each transform unit (TU) includes transforms for the luma channel and for each chroma channel. When the video encoder 114 and the video decoder 134 are configured for the 4:2:0 chroma format, the transform boundary (or 'edge') for the luma channel and for each chroma channel are aligned to the transform unit (TU) boundary. In contrast, when the video encoder 114 and the video decoder 134 are configured for the 4:2:2 chroma format and square transforms are used for each chroma channel, additional transform boundaries are present for each chroma channel. The additional transform boundaries will be described in more detail below with reference to FIGS. 8 and 9. At the boundary of a transform, discontinuities may be visible. The discontinuities reduce the perceived quality of decoded frames 412 compared to the frame data 310. The quantisation parameter applied by the scale and quantise block 322 and the inverse scale module 421 may vary between transform units (TUs). Accordingly, spatially neighbouring transforms may have different quantisation parameters applied. Generally, larger quantisation parameters and differences in the quantisation parameter applied to adjacent transforms result in poorer visual quality, due to increased transform block edge artefacts.

Figure 7A:
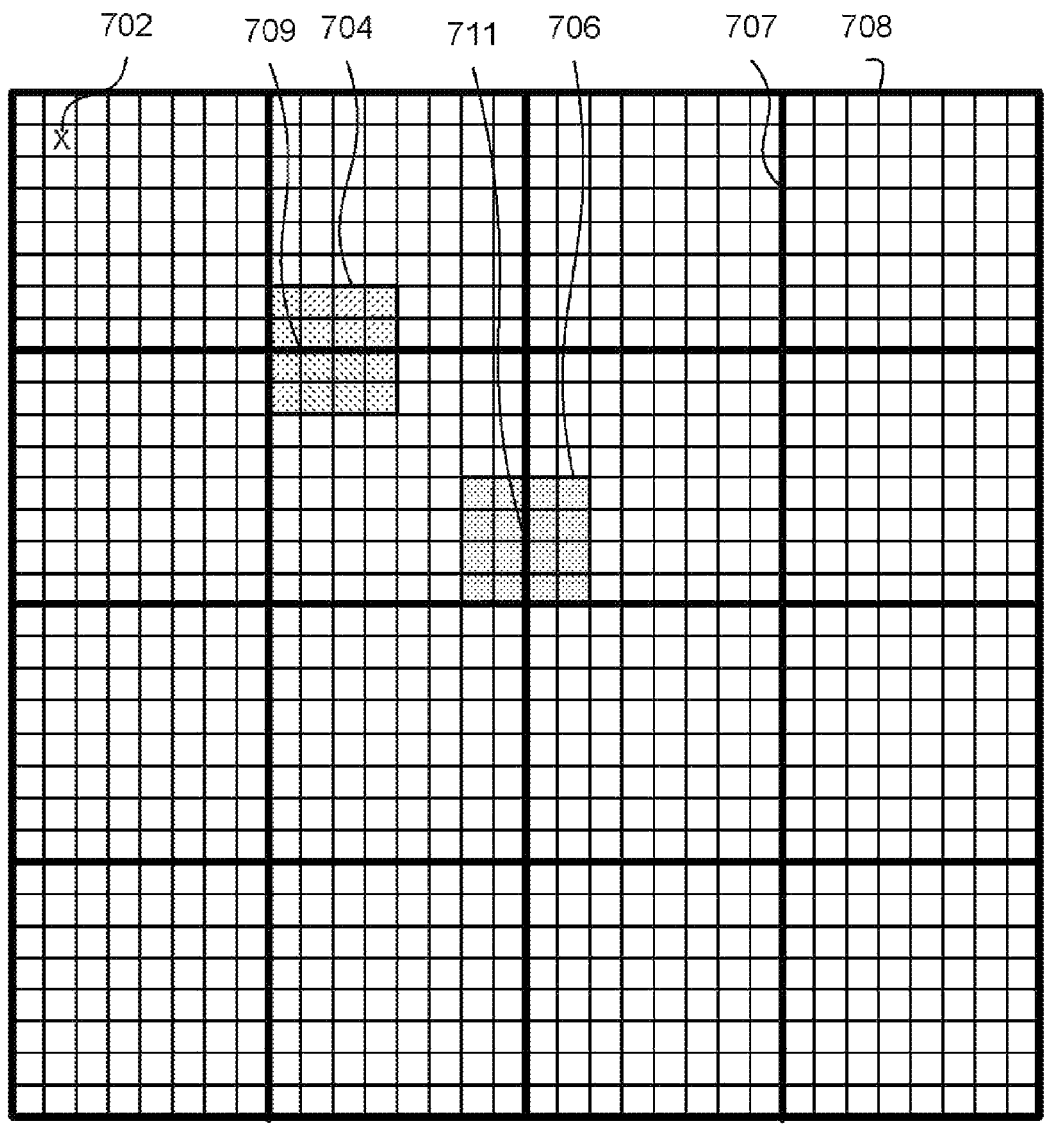
FIG. 7A schematically illustrates de-blocking boundaries for luma samples on a luma sample grid.
Figure 7B:
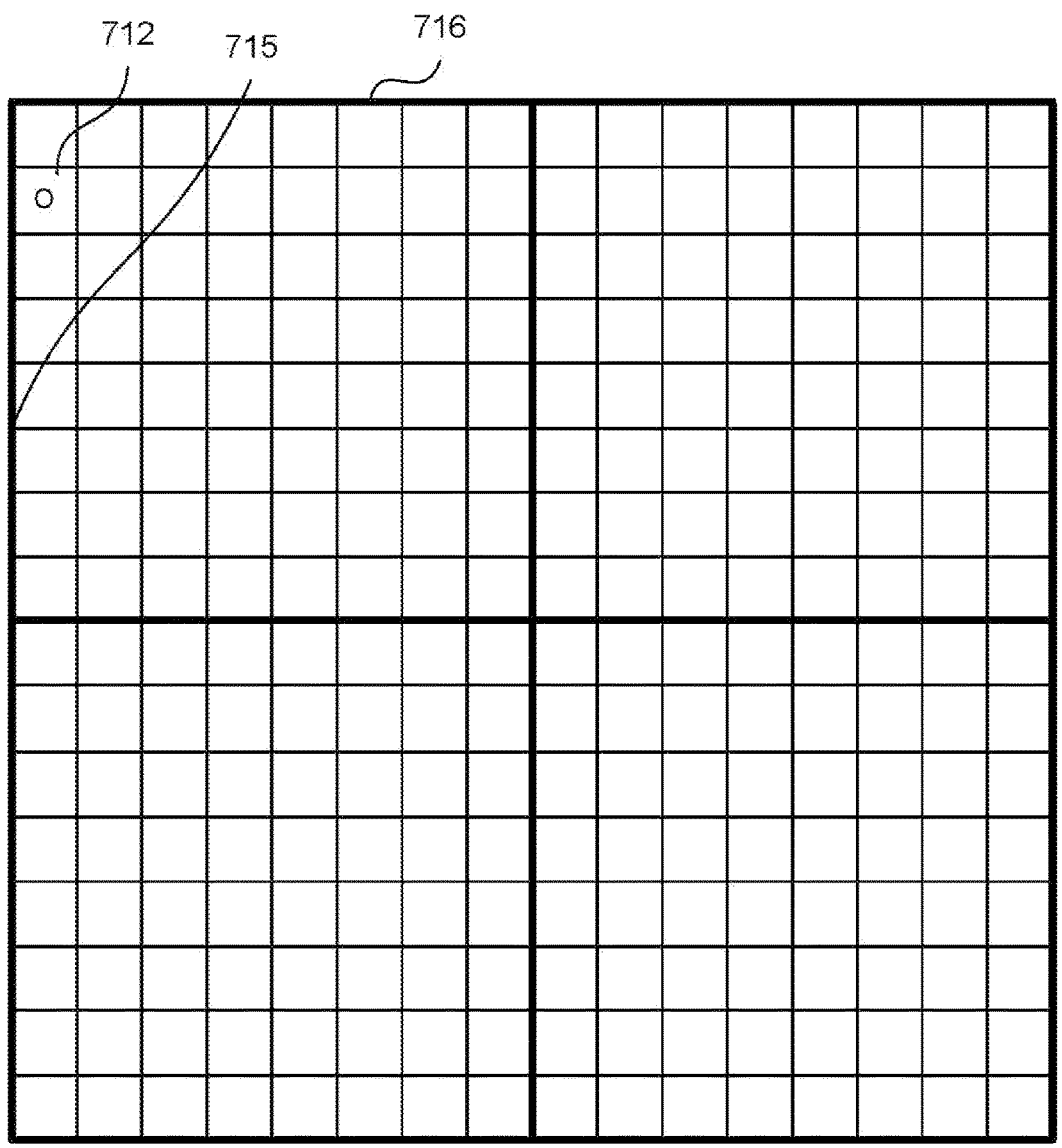
FIG. 7B schematically illustrates de-blocking boundaries for chroma samples on a chroma sample grid when a 4:2:0 chroma format is in use.
Figure 7C:
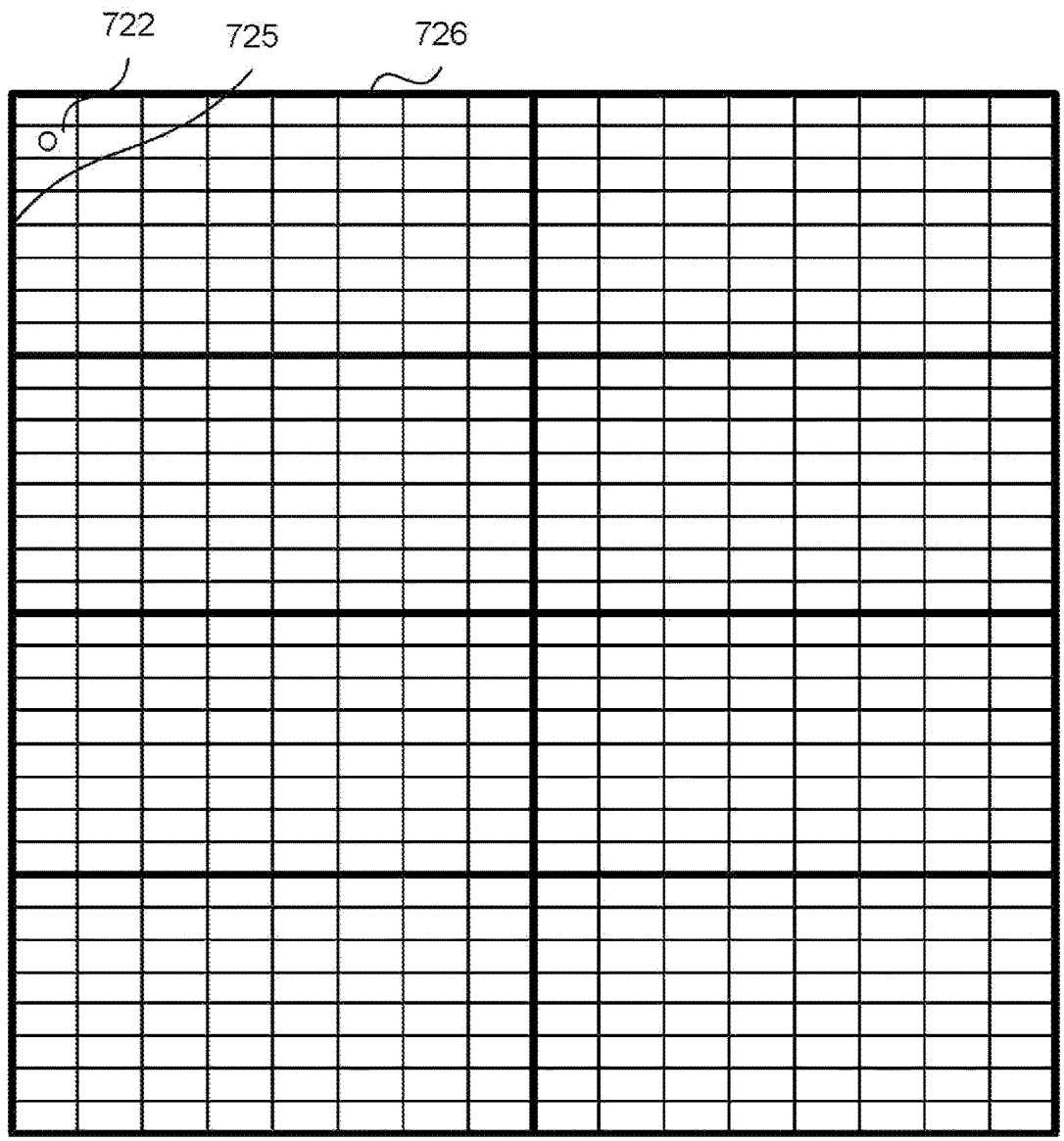
FIG. 7C schematically illustrates de-blocking boundaries for chroma samples on a chroma sample grid when a 4:2:2 chroma format is in use.

FIG. 7A schematically illustrates de-blocking boundaries for luma samples on a luma sample grid. FIG. 7B schematically illustrates de-blocking boundaries for chroma samples on a chroma sample grid when a 4:2:0 chroma format is in use. FIG. 7C schematically illustrates de-blocking boundaries for chroma samples on a chroma sample grid when a 4:2:2 chroma format is in use.

FIG. 7A shows a luma sample grid portion 700 that contains luma samples, such as luma sample 702. The luma sample 702 is illustrated with an 'X', in accordance with the notation of FIGS. 5A and 5B. As the smallest transform unit (TU) size is 4×4 and the smallest prediction unit (PU) size is also 4×4, the smallest possible granularity for edge artefacts correspond to the edges on a 4×4 grid on the luma sample grid portion 700. In practice, the 4×4 block sizes are used in regions of high detail, where edge artefacts are less apparent due to relatively high frequency content contained in the regions of high detail. To reduce complexity, a de-blocking filter is therefore applied on the edges of an 8×8 grid. The 8×8 grid is illustrated in FIG. 7A using thick lines. The 8×8 grid includes vertical edges (e.g., 707) and horizontal edges (e.g., 708). Each edge has two sides (i.e., a side to the left and a side to the right for a vertical edge and a side above and a side below for a horizontal edge). An edge may be co-incident with a boundary between transform units (TUs) or prediction units (PUs), in which case filtering is applied by the de-blocking filter modules 330 and 430 each using the de-blocking filter. The application and/or strength of the filtering applied at each side of an edge may be separately configurable. As the smallest transform unit (TU) and prediction unit (PU) size is 4×4, the filtering strength and applicability is generally determined to a granularity of four edge samples, even though the de-blocking filter is applied at the 8×8 grid. An 8-sample edge between two adjacent 8×8 blocks of luma samples is divided into two four-sample edges for the purpose of determining de-blocking filter strength. For any given edge, the two samples of each side of the edge are used as input to the de-blocking filter. For example, as seen in FIG. 7A, samples 704 include each sample located up to two samples above and two samples below a four sample horizontal edge 709. Further, samples 706 include each sample located up to two samples to the left and to the right of a four sample vertical edge 711.

FIG. 7B shows a chroma sample grid portion 710 for a chroma channel when the video encoder 114 and the video decoder 134 are configured for the 4:2:0 chroma format. The chroma sample grid portion 710 contains chroma samples, such as chroma sample 712. The chroma sample 712 is illustrated with a 'O' in accordance with the notation of FIG. 5A. Compared to the luma sample grid portion 700, each chroma sample of the chroma sample grid portion 710 occupies a 2×2 area of luma samples. For chroma sample grid portion 710, the de-blocking filter may still be applied on an 8×8 sample grid. On the chroma sample grid portion 710 the application of the de-blocking filter results in de-blocking along edges represented by the thick lines (e.g., edges 715, 716) as illustrated in FIG. 7B. An 8×8 sample grid on the chroma sample grid portion 710 corresponds to a 16×16 sample grid on the luma sample grid portion 700. As with the luma sample grid portion 700, the edge strength and applicability for the chroma sample grid is determined down to a granularity of four edge samples (e.g. due to the smallest transform size of 4×4).

FIG. 7C illustrates a chroma sample grid portion 720 for a chroma channel when the video encoder 114 and the video decoder 134 are configured for the 4:2:2 chroma format. The chroma sample grid portion 720 contains chroma samples, such as chroma sample 722. The chroma sample 722 is illustrated with a '0' in accordance with the notation of FIG. 5B. Compared to the luma sample grid portion 700, each chroma sample of the chroma sample grid portion 720 occupies a 2×1 area of luma samples. For chroma sample grid portion 720, the de-blocking filter may still be applied on an 8×8 sample grid. On the chroma sample grid portion 720, the application of the de-blocking filter results in de-blocking along edges represented by the thick lines (e.g., edges 725, 726) as illustrated in FIG. 7C. An 8×8 sample grid on the chroma sample grid portion 720 corresponds to an 8×16 sample grid on the luma sample grid portion 700. As with the luma sample grid portion 700, the edge strength and applicability for the chroma sample grid is determined down to a granularity of four edge samples (e.g. due to the smallest transform size of 4×4).

Figure 8A:
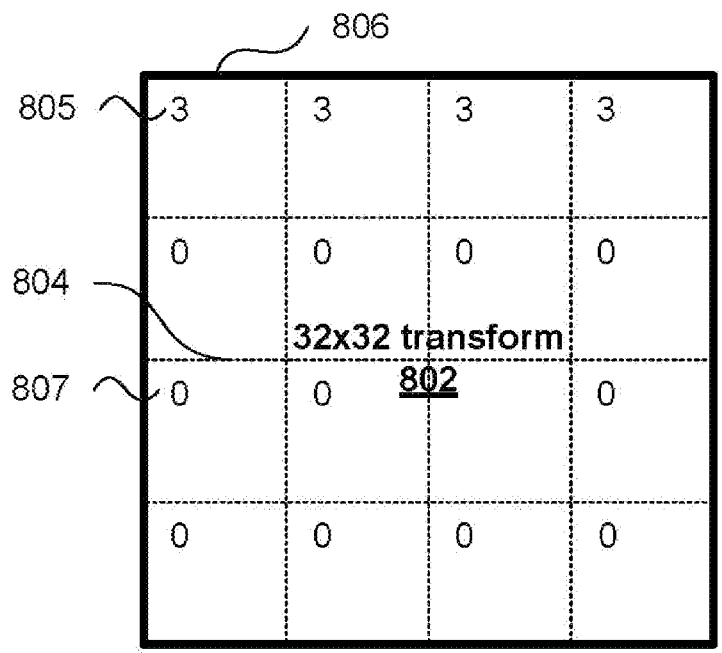
FIGS. 8A and 8B schematically illustrate de-blocking boundaries present for a 32×32 residual quad-tree (RQT) containing a 32×32 transform unit (TU) for the video encoder of FIG. 3 and the video decoder of FIG. 4 configured for a 4:2:2 chroma format.
Figure 8B:
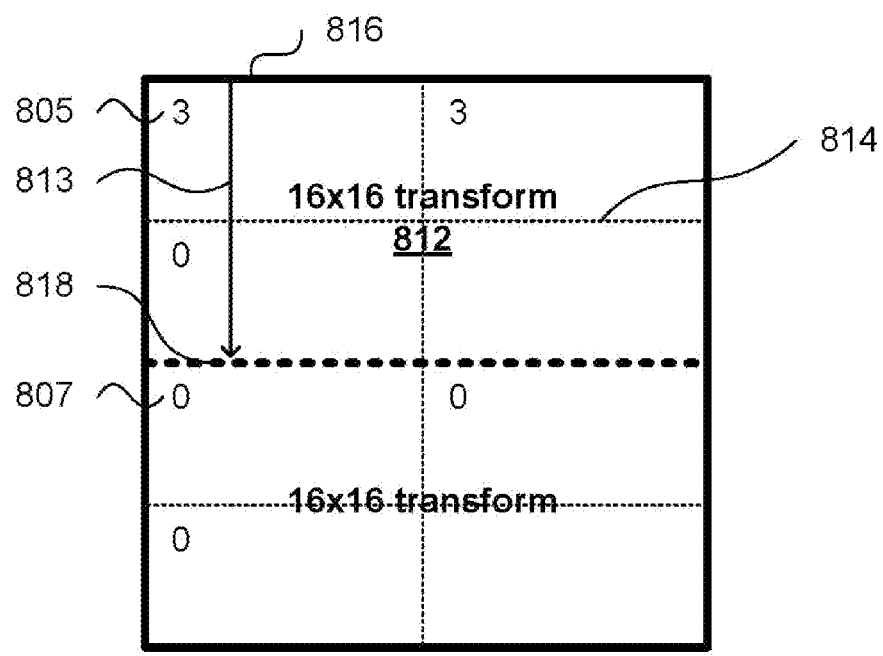

FIGS. 8A and 8B schematically illustrate de-blocking boundaries present for a 32×32 residual quad-tree containing a 32×32 transform unit (TU) for the video encoder 114 and the video decoder 134 configured for the 4:2:2 chroma format. As seen in FIG. 8A, a 32×32 transform unit (TU) results in a 32×32 transform 802 on a luma sample grid 800. As seen in FIG. 8B, the 32×32 transform unit (TU) results in two 16×16 transforms present, such as a 16×16 transform 812, on a chroma sample grid portion 810. Also shown in FIGS. 8A and 8B are possible values for the edge flag array for each horizontal edge (e.g. edge flags 805 and 807). For clarity, not all edge flag values are shown. In FIG. 8A, each 8 sample horizontal edge on the luma sample grid 800 requires one edge flag value to be present in the edge flag array. In FIG. 8B, a subset of the edge flags in the edge flag array are accessed, due to the reduced resolution of the chroma sample grid 810 compared to the luma sample grid 800. In FIG. 8A, edges along the 8×8 de-blocking grid, such as edges 804 and 806, are possible edges on which de-blocking may occur. In FIG. 8A, the thick lines (co-incident with the boundary of the 32×32 transform unit (TU) which is also the boundary of the 32×32 transform 802) represent edges for which de-blocking does occur and thin lines represent edges for which de-blocking does not occur. For example, as the edge flag 807 has a value of zero the de-blocking filter is not applied at an edge 804 (thin line). However, as the edge flag 805 has a non-zero value (three or '3' in this case), the de-blocking filter is applied at an edge 806 (thick line). In FIG. 8B, edges along the 8×8 de-blocking grid, such as edges 814, 816 and 818, are possible edges on which de-blocking may occur.

In FIG. 8B, the edges with thick lines (i.e., co-incident with the boundary of the 32×32 transform unit (TU) as signalled with the edge flag 805), such as an edge 816, represent edges for which de-blocking does occur. The edges with thick lines in FIG. 8B are co-incident with the edges with thick lines in FIG. 8A. As with FIG. 8A, edges with thin lines in FIG. 8B, such as the edge 814 are edges for which de-blocking does not occur. Edges with thick dotted lines, such as the edge 818, represent additional transform boundaries present only in each chroma channel and may be referred to as 'vertical split edges'. The additional transform boundaries result from using two square transforms instead of one rectangular transform for each chroma channel when the video encoder 114 and the video decoder 134 are configured for the 4:2:2 chroma format. By considering only the transform unit (TU) boundaries in determining which edges require de-blocking for both the luma channel and the chroma channels, such as the edges 806 and 816, are found. The additional transform boundaries result in edges that require de-blocking only for chroma, such as the edge 818. The edge flag 805 has a value of three ('3') signalling that an additional chroma edge 818 should also be de-blocked. The value of three indicates that the edge 818 is located a distance 813 below the edge 816. The distance 813 is 16 samples and corresponds to the side dimension of the 16×16 transform 812.

Figure 9A:
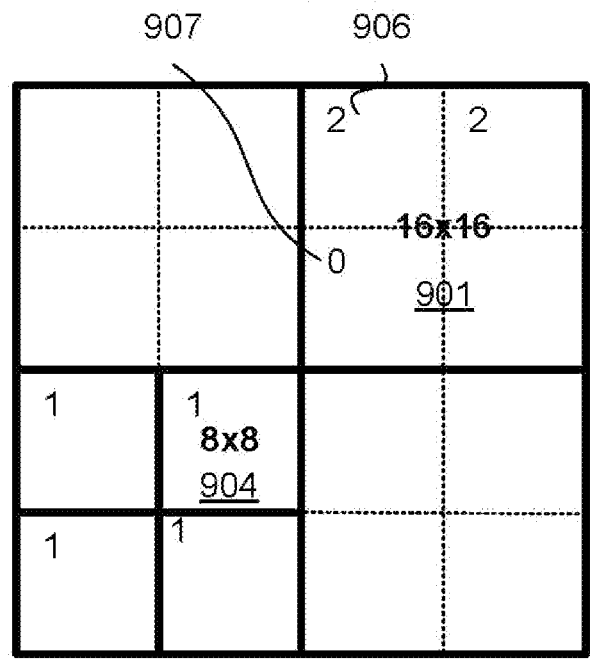
FIGS. 9A and 9B schematically illustrate de-blocking boundaries present for a 32×32 residual quad-tree containing a 16×16 transform unit (TU) and an 8×8 transform unit (TU) for the video encoder of FIG. 3 and the video decoder of FIG. 4 configured for a 4:2:2 chroma format.
Figure 9B:
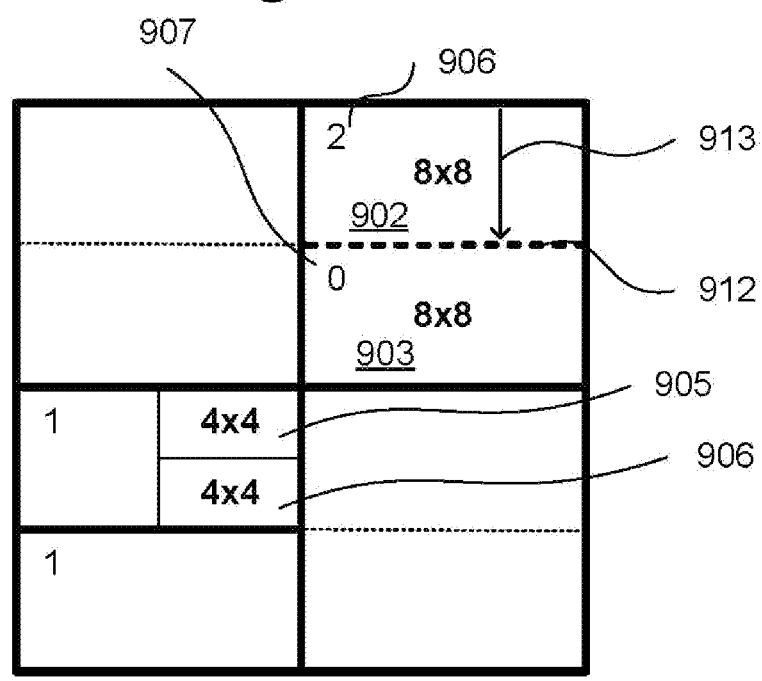

FIGS. 9A and 9B schematically illustrate de-blocking boundaries present for a 32×32 residual quad-tree (RQT) containing a 16×16 transform unit (TU) and an 8×8 transform unit (TU) for the video encoder 114 and the video decoder 134 configured for the 4:2:2 chroma format. As with FIGS. 8A and 8B, each transform unit (TU) 901 includes one square transform for the luma channel and two square transforms for each chroma channel. For example, the 16×16 transform unit (TU) results in a 16×16 transform 901 on luma sample grid 900 as seen in FIG. 9A. Further, as seen in FIG. 9B, the 16×16 transform unit (TU) results in two 8×8 transforms 902 and 903 on chroma sample grid 910. An edge flag 906 having a value of two ('2') results in de-blocking the 8 sample horizontal edge above the 8×8 transform 902 on the chroma sample grid 910 and an 8 sample section of the horizontal edge above the 16×16 transform 901 on the luma sample grid 900. The edge flag 906 having a value of two ('2') also results in de-blocking the 8 sample horizontal edge above the 8×8 transform 903 on the chroma sample grid 910 (i.e. an edge 912). An edge flag 907 having a value of zero ('0') results in not de-blocking the 8 sample horizontal edge lying within the 16×16 transform 901 on the luma sample grid 900. A distance 913 represents the distance from the upper edge of the transform unit (TU) (i.e. the upper edge of the 16×16 transform 901) to the boundary resulting from the vertical split (i.e. the edge 912). The distance 913 corresponds to the side dimension size of the 8×8 square transform 902 (i.e. the value eight or '8'). Also, the 8×8 transform unit (TU) results in an 8×8 transform 904 on the luma sample grid and two 4×4 transforms 905 and 906 on the chroma sample grid. As with FIGS. 8A and 8B, in the example of FIGS. 9A and 9B, thin lines represent edges on the 8×8 de-blocking grid for which de-blocking is not applied, thick edges represent edges on the 8×8 de-blocking grid for which de-blocking is applied and thick dotted edges represent edges on the 8×8 de-blocking grid for which de-blocking is applied for chroma only. For example, the edge 912 is required due to the two 8×8 transform used for each chroma channel of the 16×16 transform unit (TU) and is another example of a 'vertical split edge'. Note that for the 8×8 transform unit (TU), the edge between the two 4×4 transforms for each chroma channel does not lie on the 8×8 de-blocking grid and thus is not de-blocked. In arrangements where de-blocking on edges down to a 4×4 granularity is possible, edges may be de-blocked.

Figure 10:
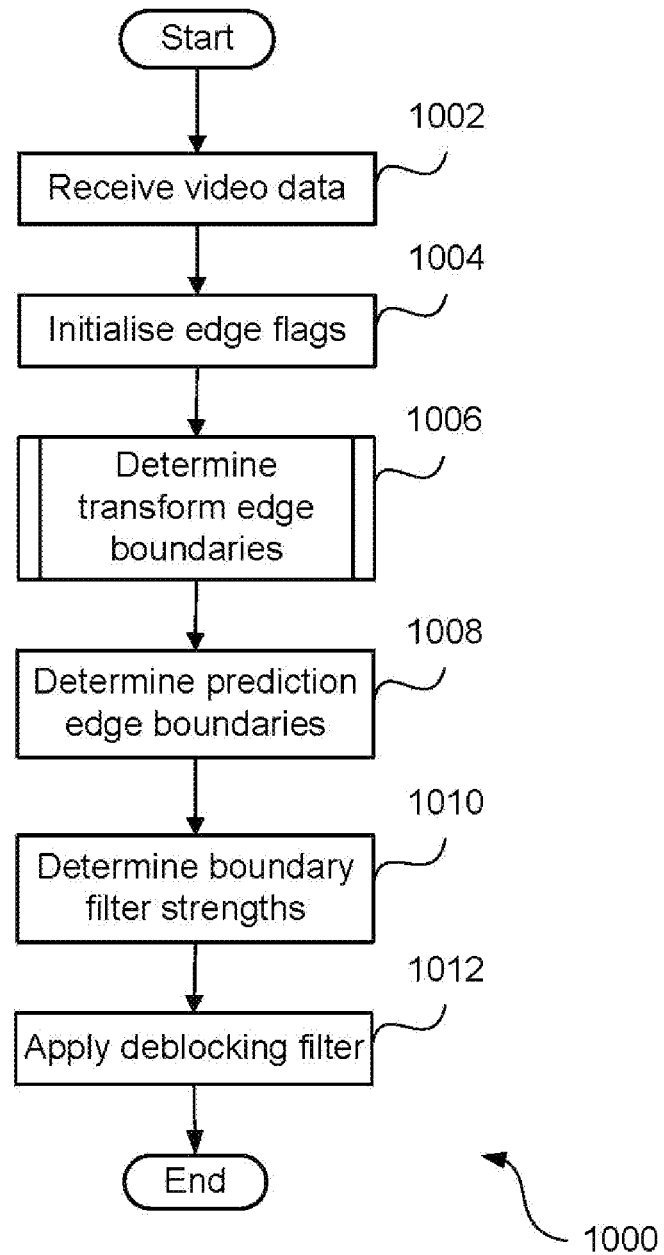
FIG. 10 is a schematic block diagram showing a method of de-blocking data samples in a video frame, applied in the video encoder of FIG. 3 and in the video decoder of FIG. 4.
Figure 11:
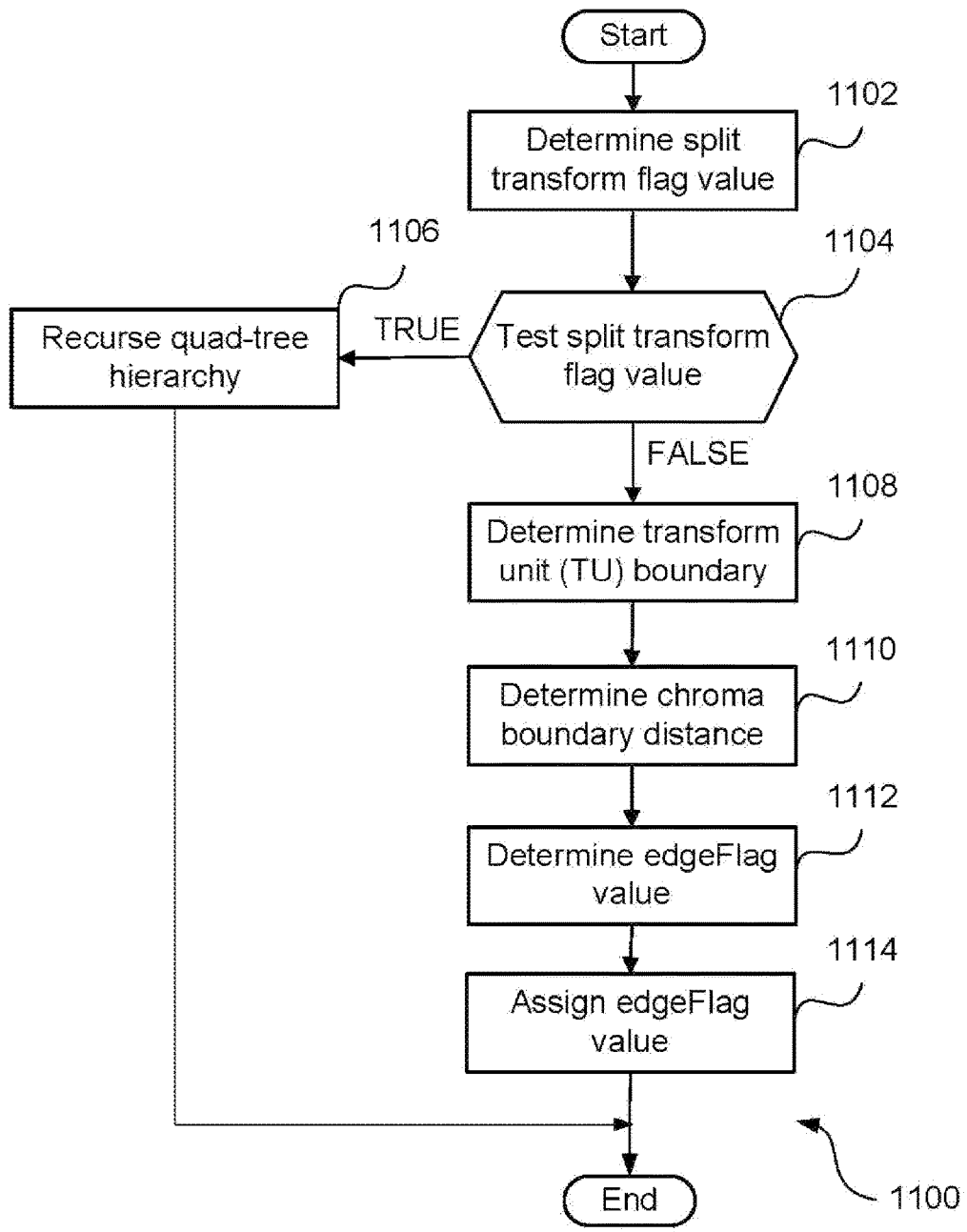
FIG. 11 is a schematic block diagram showing a method of determining edge flags, applied in the video encoder of FIG. 3 and in the video decoder of FIG. 4.

FIG. 10 is a schematic block diagram showing a method 1000 of de-blocking video data samples in a video frame. The method 1000 may be implemented as part of the video encoder 114 and the video decoder, which could, for example, be implemented as hardware or software. The method 1000 will be described by way of example where the method 1000 is implemented as one or more code modules of the software application 233 resident within the hard disk drive 210 and being controlled in its execution by the processor 205.

The method 1000 may be separately invoked to perform de-blocking along horizontal edges and vertical edges. The method 1000 will be described by way of example where horizontal edges are de-blocked, as horizontal edges are relevant for a square transform implementation of the video encoder 114 and the video decoder 134 configured for the 4:2:2 chroma format. In one arrangement, an entire frame of data samples may be de-blocked at once. In another arrangement, a portion of a frame of data samples may be de-blocked. For example, one coding tree block (CTB) may be de-blocked at a time with no difference to a resulting de-blocked frame of data samples.

The method 1000 begins at a receive video data step 1002, where the processor 205 is used for receiving video data samples of the video frame. The video data may be stored within the memory 206. The video data is configured for encoding colour channels in a 4:2:2 format where the video data is encoded in a quad-tree. In one arrangement, when the method 1000 is being executed by the video encoder 114, at the receive video data step 1002, frame data 310 is generally received from the video source 112. The video encoder 114 generally decomposes the frame data 310 into coding tree blocks (CTBs) and further decomposes each coding tree block (CTB) into one or more coding units (CUs) and residual quad-trees (RQTs).

When the method 1000 is being executed by the video decoder 134, at the receive video data step 1002, the encoded bitstream 312 is generally received from the receiver 132. The video decoder 134 generally determines (or 'recovers' or 'reconstructs') the residual quad-tree (RQT) of each coding unit (CU) of each coding tree block (CTB) of each frame. The residual quad-tree (RQT) is determined using the entropy decoder 420 to decode syntax elements from the encoded bitstream 312.

Following step 1002, the method 1000 continues at an initialise edge flags step 1004, where an array of edge flags (i.e., edge flag array) is initialised under execution of the processor 205. Each of the edge flags in the edge flag array may be used for indicating which edges are to be de-blocked for the luma channel and the chroma channel. The edge flag array is configured to have sufficient capacity to independently signal de-blocking of each edge on the 8×8 de-blocking grid on a luma sample grid (e.g., 800). Arrangements that de-block the samples within each coding tree block (CTB) separately (e.g. sequentially) only require sufficient capacity within the edge flag array to independently signal de-blocking of each edge on the 8×8 de-blocking grid on a portion of the luma sample grid (e.g. 800) corresponding to one coding tree block (CTB). As such, the location of a particular edge flag within the edge flag array determines which edge in the coding tree block (CTB) or video frame is to be de-blocked. A subset of edges on 8×8 deblocking grid on the luma sample grid are co-incident with edges on the 8×8 deblocking grid on the chroma sample grid (e.g., 810). A corresponding subset of flags in the edge flag array exists, in which each flag is used for indicating de-blocking for a corresponding chroma edge (in addition to the corresponding luma edge). Step 1004 results in all edges being marked as not for de-blocking.

Following step 1004, the method 1000 proceeds to a determine transform edge boundaries step 1006, where the array of edge flags is updated according to the structure of each residual quad-tree (RQT). A method 1100 of determining edge flags, as executed at step 1006, will be discussed further below with reference to FIG. 11. As described below, transform unit (TU) boundaries are determined in the method 1100. Edges lying on the top boundary and the left boundary of the video frame are not required to be de-blocked. Therefore, the top row of coding tree blocks (CTBs) in a video frame will not have the edge flags set for edges along the top of each coding tree block (CTB) in this row of coding tree blocks (CTBs). Further, the left column of coding tree blocks (CTBs) in a video frame will not have the edge flags set for edges along the left of each coding tree block (CTB) in this column of coding tree blocks (CTBs). Arrangements that perform de-blocking on each coding tree block (CTB) may use flags (such as a 'filterLeftEdge' flag and a 'filterTopEdge' flag) to determine if a present coding tree block (CTB) belongs to the leftmost column of coding tree blocks (CTBs) or the topmost row of coding tree blocks (CTBs).

The method 1000 proceeds from step 1006 to a determine prediction edge boundaries step 1008, where the array of edge flags is updated, under execution of the processor 205, according to the partition mode associated with each coding unit (CU).

Following step 1008, the method 1000 proceeds to a determine filter boundary strengths step 1010, where the processor 205 is used to determine the strength of the de-blocking filter to apply at each edge for which de-blocking is going to be applied. A boundary strength array holds boundary strength information for the de-blocking filter down to a granularity of every four samples along the 8×8 de-blocking grid (e.g., the grid 800). An enumeration of values for each boundary strength value is as follows:

0: Do not de-block this edge.

1: De-block luma and chroma edge because either side includes a transform with at least one non-zero coefficient.

2: De-block luma and chroma edge because either side of the edge belongs to an intra-predicted prediction unit (PU).

3: De-block chroma edge only.

At step 1010 each boundary strength value in the boundary strength array is determined using values from the edge flag array and information about the type of block on each side of each edge. Arrangements generally iterate over all possible edge flags in the edge flag array and for each edge flag, determine a corresponding boundary strength value, which is stored in the boundary strength array.

The method 1000 proceeds from step 1010 to an apply de-blocking filter step 1012, where the processor 205 is used for applying de-blocking to the transform units of the video data samples of the video frame received at step 1002. The de-blocking is applied by applying the de-blocking filtering to each edge within the frame or coding tree block (CTB) in accordance with the boundary strength array or determined edge flags of the edge flag array. Each edge is filtered according to the determined filter boundary strength, available from the boundary strength array. In some arrangements, the edge flag array information may be included within the boundary strength array, in which case the de-blocker module 330 and 430 only needs to reference the boundary strength array. In arrangements where the edge flag array information is included within the boundary strength array, an enumeration of the boundary strength value such as the enumeration described with reference to the step 1010 of FIG. 10 may be used. Further, in arrangements where the edge flag array information is included within the boundary strength array, de-blocking is only performed for edges on the luma sample grid when the boundary strength value for an edge is equal to one or two. Further, in arrangements where the edge flag array information is included within the boundary strength array, de-blocking is only performed for edges on the chroma sample grid when the boundary strength value for an edge is greater than zero. Generally, de-blocking for each chroma channel is only applied when either side of the chroma edge belongs to an intra-predicted prediction unit (PU). Both transforms resulting from a vertical split are contained within the same coding unit (CU) and all prediction units (PUs) in the partitioning of the coding unit (CU) have the same prediction type. Therefore, the additional edge for chroma is generally only de-blocked when intra-prediction is in use (which will be the case on both sides of the chroma edge). In one arrangement, an edge flag value that specifies that the present edge is a vertical split edge may be used, where de-blocking is only applied on the chroma edge. Such a vertical split edge is for the chroma channel.

In other arrangements, an edge flag value specifying the usual co-incident luma and chroma edge may also specify a vertical split edge, located a specific distance away from a present edge. The specific distance may correspond to the transform size used in the vertical split. As the present edge is generally an edge along the top of a transform unit (TU) within the residual quad-tree (RQT), the 'distance' is relative to the location of this edge in the video frame or the coding tree block (CTB). Thus, the distance may also be considered as a 'spatial offset' or an 'offset'. As the distance may correspond to the square transform side-dimension size (or 'transform size), the distance may be represented by values indicative of the transform size (such as a log 2 of the transform size, also known as 'log 2TrafoSize').

The method 1100 of determining edge flags, as executed at step 1006, will now be described with reference to FIG. 11. The method 1100 may be implemented as part of the video encoder 114 and in the video decoder 134, which could, for example, be implemented as hardware or software. The method 1100 will be described by way of example where the method 1100 is implemented as one or more code modules of the software application 233 resident within the hard disk drive 210 and being controlled in its execution by the processor 205.

The method 1100 determines edge flags resulting from transform unit (TU) boundaries and includes edges resulting from the vertical split. The method 1100 is applied to the residual quad-tree (RQT) of each coding unit (CU) in the video frame received at step 1002. A 'transform depth' variable indicates the hierarchy level within each residual quad-tree (RQT). The transform depth variable is set to zero for the root node of each residual quad-tree (RQT). As several sizes of coding units (CUs) may be used, a region corresponding to the root node of each residual quad-tree (RQT) may have several sizes. Thus, to determine the size of a given transform unit (TU), the transform depth variable and the size of the region corresponding to the root node of the residual quad-tree (RQT) root node may be considered. The method 1100 may be invoked for determining horizontal edges and for determining vertical edges. The method 1100 recursively traverses the residual quad-tree hierarchy and as such, the method 1100 may be invoked in order to determine the edges of lower nodes within the residual quad-tree (RQT) hierarchy. The method 1100 will be further described in relation to the traversing of the residual quad-tree and the horizontal edge determination, as the horizontal edge case is affected by the vertical split.

The method 1100 begins at a determine split transform flag value step 1102, where a split transform flag value is determined under execution of the processor 205. The split transform flag value specifies, for a given node in the residual quad-tree (RQT) hierarchy, whether further quad-tree split operations are performed. When the method 1100 is executed by the video encoder 114, the split transform flag value is generally determined using a rate-distortion criterion. The bit-rate cost of coding additional smaller transform units (TUs) for the split transform case is compared with the bit-rate cost of coding a single transform unit (TU) at the present node within the residual quad-tree (RQT) hierarchy. The determined split transform flag value is generally encoded in the encoded bitstream 312 by the entropy encoder 324. When the method 1100 is executed by the video decoder 134, the split transform flag value is generally determined by using the entropy decoder 420 to decode one split transform flag syntax element from the encoded bitstream 312.

Following step 1102, the method 1100 proceeds to a test split transform flag value step 1104. At step 1104, the determined split transform flag value is tested to determine if the present node within the residual quad-tree (RQT) hierarchy is further sub-divided into four sub-nodes. If the split transform flag is determined to have a value of one at step 1104 (i.e., TRUE), then the present node is sub-divided and control passes to a recurse quad-tree hierarchy step 1106. Otherwise, the present node is not sub-divided and control passes to a determine transform unit (TU) boundary step 1108.

At the recurse quad-tree hierarchy step 1106, the processor 205 is used to perform a quad-tree split within the residual quad-tree (RQT) hierarchy by invoking the method 1100 four times, with the transform depth variable incremented by one. The steps 1102 to 1106 thus result in a traversal of a residual quad-tree (RQT) hierarchy for generating a plurality of transform units (TUs) for one of the luma or chroma colour channels based on the traversed quad-tree. As described above, each transform unit determined in step 1106 including at least one transform. Once the step 1106 completes, the method 1100 terminates.

At the determine transform unit (TU) boundary step 1108, the edges to be de-blocked are determined by iterating over the edges of the present transform unit (TU) boundary. For the horizontal edge case, the upper edge of the transform unit (TU) is determined. The upper edge requires de-blocking to be applied in both luma and chroma cases. When the transform unit (TU) size is 4×4, the upper edge may not be de-blocked as the edge may not lie on the 8×8 de-blocking grid.

Following step 1108, the method 1100 proceeds to a determine chroma boundary distance step 1110, where the distance to the chroma edge resulting from the vertical split is determined under execution of the processor 205. The determined distance is referred to as the chroma boundary distance. The chroma boundary distance corresponds to the size of the square transforms used for each chroma channel for the transform unit (TU). The chroma boundary distance represents a distance from an edge of the transform unit (TU) to a boundary of one of the square transforms of the transform unit (TU). The chroma boundary distance is generally determined based on a 'transform size' variable, which is dependent on the size of the region corresponding to the root node of the residual quad-tree (RQT) (i.e. the size of the coding unit (CU) containing the residual quad-tree (RQT)) and the transform depth. The chroma boundary distance is generally relative to the upper edge of the transform unit (TU). As such, the chroma boundary distance is relative to a level in a hierarchy of the transform unit (TU).

As chroma de-blocking is generally only applicable when the collocated prediction unit (PU) uses intra-prediction, step 1110 is generally only applicable in this case. One possible 'transform size' variable is named 'log 2TrafoSize'. The log 2TrafoSize variable is enumerated as follows:
  32×32 transform: log 2TrafoSize=5
  16×16 transform: log 2TrafoSize=4

8×8 transform: log 2TrafoSize=3
4×4 transform: log 2TrafoSize=2

The log 2TrafoSize variable generally describes the size of the transform for the luma channel. Arrangements using a vertical split will generally have a chroma transform having half the width and height of the luma transform size. Arrangements using a vertical split will thus have an effective 'log 2TrafoSize' variable value for chroma equal to the log 2TrafoSize value decremented by one.

The method 1100 proceeds from step 1110 to a determine edge flag value step 1112, where the processor 205 is used for determining edge flag values for the transform unit (TU) (i.e., one of the transform units (TUs) generated at step 1106). The edge flag values are used to hold the determined boundary information in the edge flag array for the transform unit (TU). Each edge flag value of an edge flag may be used for indicating the chroma boundary distance determined in step 1110 for the transform unit (TU). In one arrangement, the transform unit (TU) boundary and the distance to the chroma boundary for the vertical split may be encoded into a single edge flag value. One enumeration for the edge flag value is as follows:

0: Do not de-block
1: De-block luma and chroma edge
2: De-block luma and chroma edge, also de-block chroma edge 8 samples away
3: De-block luma and chroma edge, also de-block chroma edge 16 samples away
4: De-block luma and chroma edge, also de-block chroma edge 32 samples away In arrangements where the transform unit (TU) boundary and the distance to the chroma boundary for the vertical split is encoded into a single edge flag value, the edge flag values greater than one ('1') are only used when the video encoder 114 or the video decoder 134 is configured to use the 4:2:2 chroma format and generally when the collocated prediction unit (PU) uses intra-prediction. The edge flag value of four ('4') is only possible when the video encoder 114 and the video decoder 134 support use of a 32×32 transform in each chroma channel. Further, the additional chroma edge resulting from the vertical split will be 32 chroma samples away from the top transform unit (TU) boundary. Therefore, an edge flag value of four ('4') is required for arrangements where the transform unit (TU) boundary and the distance to the chroma boundary for the vertical split is encoded into a single edge flag value.

Not all arrangements support a 32×32 transform for each chroma channel. Arrangements not supporting a 32×32 transform for each chroma channel do not require support for an edge flag value for four ('4'). Arrangements not supporting a 32×32 transform for each chroma channel only have four possible values for the edge flag value, and therefore only require two bits of storage for each edge flag value. Other enumerations for the edge flag value are also possible.

Appendix A shows possible 'working draft' text describing the operation for one arrangement, generally applicable to draft text for the high efficiency video coding (HEVC) standard under development, such as the draft text in the contribution 'JCTVC-K1003_v13'.

As transform sizes increase in powers of two, the chroma boundary 'distance' may be expressed as powers of two. Furthermore, the direction of the additional chroma edge is generally below the luma and chroma edge for horizontal de-blocking. Each edge flag may be used to control the performing of de-blocking on a chroma edge, located separately to the location implied by the position of the edge flag within the edge flag array. For transform units (TUs) that lie along the top edge of the video frame and for each chroma channel, the transform boundary due to the vertical split should be de-blocked, whereas the top boundary of the transform unit (TU) should not be de-blocked Arrangements may perform an additional masking aspect in the apply de-blocking filter step 1012 for edges along the top of each coding tree block (CTB) or frame, such that the edge flag value is masked with the 'filterEdgeFlag' to prevent de-blocking along the top ledge of the frame, where de-blocking may be undesired, whilst retaining de-blocking of the chroma edge at the vertical split boundary. Alternatively, arrangements may not perform de-blocking of the vertical split boundary for transform units (TUs) having a top edge along the top edge of the video frame.

In an alternative arrangement, the method 1100 may determine an edge flag value specifying the chroma boundary for the vertical split, to be stored at location(s) in the edge flag array corresponding to the chroma edge flag array. In such an alternative arrangement, a possible enumeration for the edge flag value is as follows:

0: Do not de-block
1: De-block luma and chroma edge
2: De-block chroma edge

In an arrangement where the method 1100 determines an edge flag value specifying the chroma boundary for the vertical split, edge flags assigned with the 'de-block chroma edge' flag are stored at locations relative to the location corresponding to the upper boundary of the transform unit (TU) and offset by the determined distance (or spatial offset). As the 'de-block chroma edge' flags are located below the upper boundary of the transform unit (TU), the location of the 'de-block chroma edge' flags are determined as being below (i.e. in a downward direction from) the locations of the corresponding flags for the upper boundary of the transform unit (TU) and the transform size for the chroma channel. The location of the 'de-block chroma edge' is based on the determined size of the transform in the chroma colour channel. For example, if the transform unit (TU) size is 16×16, each chroma channel will have two 8×8 chroma transforms, where one chroma edge exists along the boundary of the two 8×8 chroma transforms. The chroma edge existing along the boundary of the two 8×8 chroma transforms is de-blocked in the chroma channel only, as the luma transform does not have a boundary along the chroma edge. The chroma edge is spaced eight (8) chroma samples from the top of the transform unit (TU) boundary (i.e. the upper boundary of the upper or first chroma transform).

The edge flag value of two ('2') is only used when the video encoder 114 or the video decoder 134 is configured to use the 4:2:2 chroma format.

Appendix B shows possible 'working draft' text describing the operation for one arrangement, generally applicable to draft text for the high efficiency video coding (HEVC) standard under development, such as the draft text in the contribution 'JCTVC-K1003_v13'.

Following step 1112, the method 1100 proceeds to an assign edge flags step 1114, where the determined edge flag value is assigned to the edge flag array. The method 1100 then terminates following step 1114.

Figure 12A:
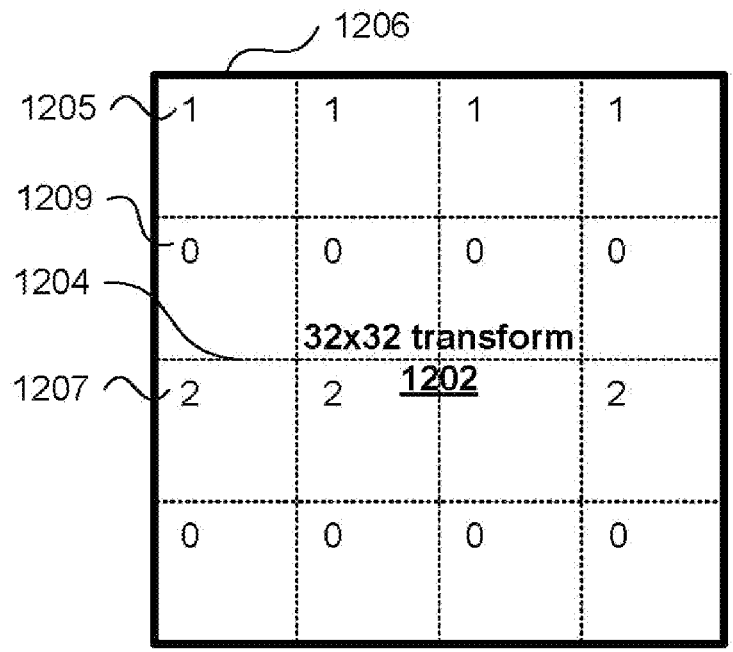
FIGS. 12A and 12B schematically illustrate de-blocking boundaries present for a 32×32 residual quad-tree (RQT) containing a 32×32 transform unit (TU) for the video encoder of FIG. 3 and the video decoder of FIG. 4 configured for a 4:2:2 chroma format according to an further arrangement.
Figure 12B:
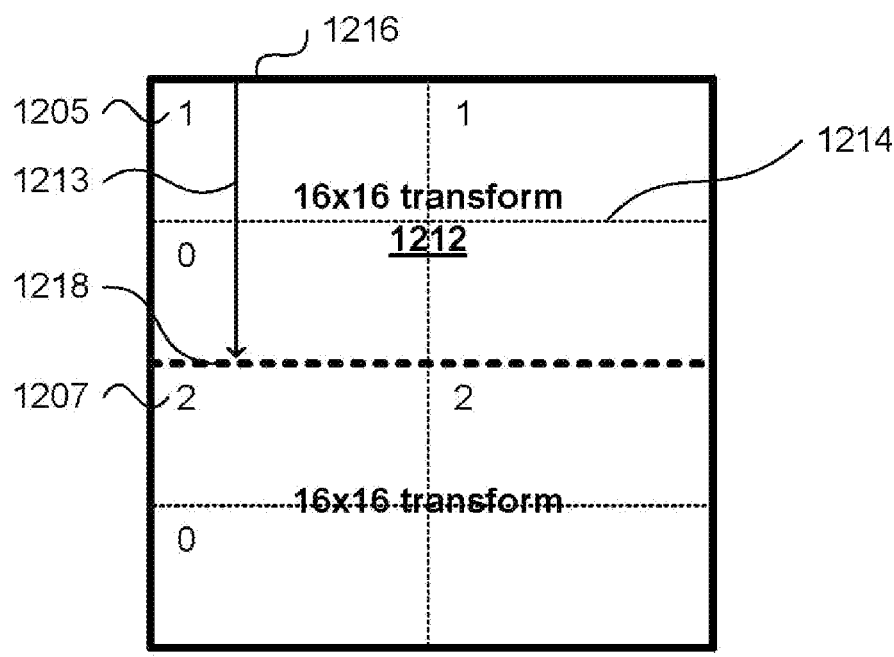

FIGS. 12A and 12B schematically illustrate de-blocking boundaries present for a 32×32 residual quad-tree containing a 32×32 transform unit (TU) for the video encoder 114 and the video decoder 134 configured for the 4:2:2 chroma format. As seen in FIG. 12A, a 32×32 transform unit (TU) results in a 32×32 transform 1202 on a luma sample grid 1200. As seen in FIG. 12B, the 32×32 transform unit (TU)

results in two 16×16 transforms present, such as a 16×16 transform 1212, on a chroma sample grid portion 1210. Also shown in FIGS. 12A and 12B are possible values for the edge flag array for each horizontal edge (e.g. edge flags 1205 and 1207). For clarity, not all edge flag values are shown. In FIG. 12A, each 8 sample horizontal edge on the luma sample grid 1200 requires one edge flag value to be present in the edge flag array. In FIG. 12B, a subset of the edge flags in the edge flag array are accessed, due to the reduced resolution of the chroma sample grid 1210 compared to the luma sample grid 1200. In FIG. 12A, edges along the 8×8 de-blocking grid, such as edges 1204 and 1206, are possible edges on which de-blocking may occur. In FIG. 12A, the thick lines (co-incident with the boundary of the 32×32 transform unit (TU) which is also the boundary of the 32×32 transform 1202) represent edges for which de-blocking does occur and thin lines represent edges for which de-blocking does not occur. For example, as the edge flag 1209 has a value of zero the de-blocking filter is not applied at an edge located within the 32×32 transform 1202 (shown using a thin line). However, as the edge flag 1205 has a non-zero value (one or '1' in this case), the de-blocking filter is applied at an edge 1206 (thick line) located on the luma sample grid 1200. In FIG. 12B, edges along the 8×8 de-blocking grid, such as edges 1214, 1216 and 1218, are examples of possible edges on which de-blocking may occur. An edge flag 1207 has a value of two ('2') indicating that de-blocking does not occur for the corresponding edge 1204 on the luma sample grid 1200.

In FIG. 12B, the edges with thick lines (i.e., co-incident with the boundary of the 32×32 transform unit (TU) as signalled with the edge flag 1205), such as an edge 1216, represent edges for which de-blocking does occur. The edges with thick lines in FIG. 12B are co-incident with the edges with thick lines in FIG. 12A. As with FIG. 12A, edges with thin lines in FIG. 12B, such as the edge 1214 are edges for which de-blocking does not occur. Edges with thick dotted lines, such as the edge 1218, represent additional transform boundaries present only in each chroma channel and may be referred to as 'vertical split edges'. The additional transform boundaries result from using two square transforms instead of one rectangular transform for each chroma channel when the video encoder 114 and the video decoder 134 are configured for the 4:2:2 chroma format. By considering only the transform unit (TU) boundaries in determining which edges require de-blocking for both the luma channel and the chroma channels, such as the edges 1206 and 1216, are found. The additional transform boundaries result in edges that require de-blocking only for chroma, such as the edge 1218. The edge flag 1205 has a value of one ('1') signalling that the chroma edge 1216 on the chroma sample grid 1210 should be de-blocked. The edge flag 1207 has a value of one ('1') signalling that the chroma edge 1218 on the chroma sample grid 1210 should be de-blocked. The chroma edge 1218 is due to the boundary between the two 16×16 transforms (e.g. 1212) resulting from the vertical split. The relative location of the edge flag 1207 relative to the edge flag 1205 in the edge flag array is due to the side dimension size of the 16×16 transform 1212.

In some arrangements, a square transform (e.g. a 32×32 transform) may be split into multiple smaller square transforms. For example, when the video encoder 114 and the video decoder 134 are configured to use the 4:4:4 chroma format, chroma regions for each transform unit of the size 32×32 are possible. In some arrangements, the 32×32 chroma region may be split into four 16×16 chroma regions (arranged '2×2' spatially) and may apply a 16×16 transform for each of the four 16×16 chroma regions. Such arrangements will introduce a 'vertical split' boundary, corresponding to the vertical split in the square transform implementation for the 4:2:2 chroma format. Further, a 'horizontal split' boundary will also be introduced. The horizontal split boundary results from boundaries introduced between the two columns of 16×16 transforms resulting from the split. Both the horizontal split and the vertical split are considered as 'inferred splits', as the horizontal split and the vertical split are not signalled in the encoded bitstream 312. This is in contrast to the quad-tree splits in the residual quad-tree (RQT), each of which is signalled using a 'transform_split_flag' encoded in the encoded bitstream 312. The methods 1000 and 1100, although described with reference to horizontal de-blocking, may also be applied to vertical deblocking. Arrangements that apply the methods 1000 and 1100 to vertical deblocking thus result in de-blocking the horizontal split boundary.

The arrangements described thus enable the de-blocking module 330 and 430 to perform de-blocking filtering of edges located along the boundary between square transforms resulting from a vertical split of a rectangular chroma region into two square chroma regions. The described arrangements may provide improved visual quality, due to the suppression of transform boundary artefacts in the decoded video frames 412. The described arrangements result in the application of the de-blocking filter to additional edges and thus an increase is complexity may occur. However, in a case where a frame is decomposed into many small transform units (TUs) resulting in application of the de-blocking filter along all edges on the 8×8 de-blocking grid (for luma and chroma), no additional edges are required to be de-blocked. No additional edges are required to be de-blocked, since the additional edges resulting from the vertical split do not lie on the 8×8 de-blocking grid. As complexity of the deblocking filter in such a case is not affected, hardware implementations are not required to introduce additional circuitry to support de-blocking along the additional transform boundaries resulting from the vertical split.

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

APPENDIX A

IMPLEMENTATION OF THE DEBLOCKING FILTER

8.7.2.1 Derivation process of transform block boundary

Inputs of this process are:
- a luma location ( xC, yC ) specifying the top-left sample of the current luma coding block relative to the top-left luma sample of the current picture,
- a luma location ( xB0, yB0 ) specifying the top-left sample of the current luma block relative to the top-left sample of the current luma coding block,
- a variable log2TrafoSize specifying the size of the current block,
- a variable trafoDepth,
- a variable filterEdgeFlag,
- a variable edgeType specifying whether a vertical (EDGE_VER) or a horizontal (EDGE_HOR) edge is filtered.

Output of this process is:
- a two-dimensional (nS)x(nS) array edgeFlags.

Depending on split_transform_flag[ xC + xB0 ][ yC + yB0 ][ trafoDepth ], the following applies:
- If split_transform_flag[ xC + xB0 ][ yC + yB0 ][ trafoDepth ] is equal to 1, the following ordered steps apply:

1. The variables xB1 and yB1 are derived as follows.
      - The variable xB1 is set equal to xB0 + ( ( 1 << log2TrafoSize ) >> 1 ).
      - The variable yB1 is set equal to yB0 + ( ( 1 << log2TrafoSize ) >> 1 ).

2. The deriviation process of transform block boundary as specified in this subclause is invoked with the luma location ( xC, yC ), the luma location ( xB0, yB0 ), the variable log2TrafoSize set equal to log2TrafoSize − 1, the variable trafoDepth1 set equal to trafoDepth + 1, the variable filterEdgeFlag and the variable edgeType as inputs and the output is the modified version of array edgeFlags.

3. The deriviation process of transform block boundary as specified in this subclause is invoked with the luma location ( xC, yC ), the luma location ( xB1, yB0 ), the variable log2TrafoSize set equal to log2TrafoSize − 1, the variable trafoDepth1 set equal to trafoDepth + 1, the variable filterEdgeFlag and the variable edgeType as inputs and the output is the modified version of array edgeFlags.

4. The deriviation process of transform block boundary as specified in this subclause is invoked with the luma location ( xC, yC ), the luma location ( xB0, yB1 ), the variable log2TrafoSize set equal to log2TrafoSize − 1, the variable trafoDepth1 set equal to trafoDepth + 1, the variable filterEdgeFlag and the variable edgeType as inputs and the output is the modified version of array edgeFlags.

5. The deriviation process of transform block boundary as specified in this subclause is invoked with the luma location ( xC, yC ), the luma location ( xB1, yB1 ), the variable log2TrafoSize set equal to log2TrafoSize − 1, the variable trafoDepth1 set equal to trafoDepth + 1, the variable filterEdgeFlag and the variable edgeType as inputs and the output is the modified version of array edgeFlags.

— Otherwise (split_transform_flag[ xC + xB0 ][ yC + yB0 ][ trafoDepth ] is equal to 0), the following applies:

- If edgeType is equal to EDGE_VER, the value of edgeFlags[ xB0 ][ yB0 + k ] for k = 0..( 1 << log2TrafoSize ) − 1 is derived as follows.
    - If xB0 is equal to 0, edgeFlags[ xB0 ][ yB0 + k ] is set equal to filterEdgeFlag.
    - Otherwise edgeFlags[ xB0 ][ yB0 + k ] is set equal to 1.
- Otherwise (edgeType is equal to EDGE_HOR), the value of edgeFlags[ xB0 + k ][ yB0 ] for k = 0..( 1 << log2TrafoSize ) − 1 is derived as follows.
    - If yB0 is equal to 0, edgeFlags[ xB0 + k ][ yB0 ] is set equal to filterEdgeFlag.
    - Otherwise, when ChromaArrayType is equal to 2, edgeFlags[ xB0 + k ][ yB0 ] is set equal to log2TrafoSize − 2 and when ChromaArrayType is not equal to 2, edgeFlags[ xB0 + k ][ yB0 ] is set equal to 1.

8.7.2.3    Derivation process of boundary filtering strength

Inputs of this process are:

— a luma picture sample array $recPicture_L$,

— a luma location ( xC, yC ) specifying the top-left sample of the current luma coding block relative to the top-left luma sample of the current picture, — a variable log2CbSize specifying the size of the current luma coding block, — a variable edgeType specifying whether a vertical (EDGE_VER) or a horizontal (EDGE_HOR) edge is filtered, — a two-dimensional array of size (nS)x(nS), edgeFlags.

Output of this process is:

— a two-dimensional array of size (nS)x(nS), bS specifying the boundary filtering strength.

The boundary filtering strength array bS for the current coding unit is derived as follows.

The variables $xD_i$, $yD_j$, xN and yN are derived as follows.

- If edgeType is equal to EDGE_VER, $xD_i$ is set equal to ( i << 3 ), $yD_j$ is set equal to ( j << 2 ), xN is set equal to (1 << ( log2CbSize − 3 )) − 1 and yN is set equal to (1 << ( log2CbSize − 2 )) − 1.
- Otherwise (edgeType is equal to EDGE_HOR), $xD_i$ is set equal to ( i << 2 ), $yD_j$ is set equal to ( j << 3 ), xN is set equal to (1 << ( log2CbSize − 2 )) − 1 and yN is set equal to (1 << ( log2CbSize − 3 )) − 1.

For $xD_i$ with i = 0..xN, the following applies.

For $yD_j$ with $j = 0..yN$, the following applies.

- If edgeFlags[ $xD_i$ ][ $yD_j$ ] is greater than 0, the sample values are derived as follows.
    - If edgeType is equal to EDGE_VER, sample $p_0 = recPicture_L[\ xC + xD_i - 1\ ][\ yC + yD_j\ ]$ and $q_0 = recPicture_L[\ xC + xD_i\ ][\ yC + yD_j\ ]$.
    - Otherwise (edgeType is equal to EDGE_HOR), sample $p_0 = recPicture_L[\ xC + xD_i\ ][\ yC + yD_j - 1\ ]$ and $q_0 = recPicture_L[\ xC + xD_i\ ][\ yC + yD_j\ ]$.

Depending on $p_0$ and $q_0$, the variable bS[ $xD_i$ ][ $yD_j$ ] is derived as follows.

- If the sample $p_0$ or $q_0$ is in the luma coding block of a coding unit coded with intra prediction mode, the variable bS[ $xD_i$ ][ $yD_j$ ] is set equal to 2.

- If the sample $p_0$ or $q_0$ is in the luma coding block of a coding unit coded with intra prediction mode and edgeFlags[ $xD_i$ ][ $yD_j$ ] is greater than 1, the variable bS[ $xD_i$ ][ $yD_j$ + ( 1 << ( edgeFlags[ $xD_i$ ][ $yD_j$ ] + 1 ) ) ] is set equal to 3.

- Otherwise, if the block edge is also a transform block edge and the sample $p_0$ or $q_0$ is in a luma transform block which contains one or more non-zero transform coefficient levels, the variable bS[ $xD_i$ ][ $yD_j$ ] is set equal to 1.

- Otherwise, the following applies.
    - If one or more of the following conditions are true, the variable bS[ $xD_i$ ][ $yD_j$ ] is set equal to 1.
        - For the prediction of the luma prediction block containing the sample $p_0$ different reference pictures or a different number of motion vectors are used than for the prediction of the luma prediction block containing the sample $q_0$.

NOTE 1 – The determination of whether the reference pictures used for the two luma prediction blocks are the same or different is based only on which pictures are referenced, without regard to whether a prediction is formed using an index into reference picture list 0 or an index into reference picture list 1, and also without regard to whether the index position within a reference picture list is different.

NOTE 2 – The number of motion vectors that are used for the prediction of a luma prediction block with lop left luma sample covering ( xB, yB ), is equal to PredFlagL0[ xB, yB ] + PredFlagL1[ xB, yB ].

- One motion vector is used to predict the luma prediction block containing the sample $p_0$ and one motion vector is used to predict the luma prediction block containing the sample $q_0$ and the absolute difference between the horizontal or vertical component of the motion vectors used is greater than or equal to 4 in units of quarter luma samples.

- Two motion vectors and two different reference pictures are used to predict the luma prediction block containing the sample $p_0$ and two motion vectors for the same two reference pictures are used to predict the luma prediction block containing the sample $q_0$ and the absolute difference between the horizontal or vertical component of the two motion vectors used in the prediction of the two luma prediction blocks for the same reference picture is greater than or equal to 4 in units of quarter luma samples,

- Two motion vectors for the same reference picture are used to predict the luma prediction block containing the sample $p_0$ and two motion vectors for the same reference picture are used to predict the luma prediction block containing the sample $q_0$ and all of the following conditions are true:

- The absolute difference between the horizontal or vertical component of list 0 motion vectors used in the prediction of the two luma prediction bocks is greater than or equal to 4 in quarter luma samples or the absolute difference between the horizontal or vertical component of the list 1 motion vectors used in the prediction of the two luma prediction blocks is greater than or equal to 4 in units of quarter luma samples,

- The absolute difference between the horizontal or vertical component of list 0 motion vector used in the prediction of the luma prediction block containing the sample $p_0$ and the list 1 motion vector used in the prediction of the luma prediction block containing the sample $q_0$ is greater than or equal to 4 in units of quarter luma samples or the absolute difference between the horizontal or vertical component of the list 1 motion vector used in the prediction of the luma prediction block containing the sample $p_0$ and list 0 motion vector used in the prediction of the luma prediction block containing the sample $q_0$ is greater than or equal to 4 in units of quarter luma samples.

- Otherwise (none of the conditions above is true), the variable bS[ $xD_i$ ][ $yD_j$ ] is set equal to 0.

- Otherwise (edgeFlags[ $xD_i$ ][ $yD_j$ ] is equal to 0), the variable bS[ $xD_i$ ][ $yD_j$ ] is set equal to 0.

8.7.2.4.2  Horizontal edge filtering process

Inputs of this process are:

- picture sample arrays recPicture$_L$, recPicture$_{Cb}$ and recPicture$_{Cr}$.

- a luma location ( xC, yC ) specifying the top-left sample of the current luma coding block relative to the top-left luma sample of the current picture,

- a variable log2CbSize specifying the size of the current luma coding block,

- an array bS specifying the boundary filtering strength.

Outputs of this process are:

- the modified picture sample arrays recPicture$_L$, recPicture$_{Cb}$ and recPicture$_{Cr}$.

The filtering process for edges in the luma coding block of the current coding unit consists of the following ordered steps:

1. The variable nD is set equal to 1 << ( log2CbSize − 3 ).
2. For $yD_m$ set equal to m << 3, m = 0..nD − 1, the following applies.
   For $xD_k$ set equal to k << 2, k = 0..nD*2 − 1, the following applies.

- When bS[ $xD_k$ ][ $yD_m$ ] is greater than 0 and less than 3, the following ordered steps apply.

a. The decision process for luma block edges as specified in subclause 8.7.2.4.3 is invoked with the luma picture sample array $recPicture_L$, the location of the luma coding block ( xC, yC ), the luma location of the block ( $xD_k$, $yD_m$ ), a variable edgeType set equal to EDGE_HOR, and the boundary filtering strength bS[ $xD_k$ ][ $yD_m$ ] as inputs, the decisions dE, dEp, dEq, and the variables β, $t_C$ as outputs.

b. The filtering process for luma block edges as specified in subclause 8.7.2.4.4 is invoked with the luma picture sample array $recPicture_L$, the location of the luma coding block ( xC, yC ), the luma location of the block ( $xD_k$, $yD_m$ ), a variable edgeType set equal to EDGE_HOR, the decisions dEp, dEp, dEq, and the variables β, $t_C$ as inputs and the modified luma picture sample array $recPicture_L$ as output.

The filtering process for edges in the chroma coding blocks of current coding unit consists of the following ordered steps:

1. The variable nD is set equal to 1 << ( log2CbSize − 3 ).
2. For $yD_m$ set equal to m << 2, m = 0..nD − 1, the following applies.
   For $xD_k$ set equal to k << 2, k = 0..nD*2 − 1, the following applies.

- When bS[ $xD_k$*2 ][ $yD_m$*2 ] is greater than 1 and (( $yD_m$ >> 3 ) << 3) is equal to $yD_m$, the following ordered steps apply.

a. The filtering process for chroma block edges as specified in subclause 8.7.2.4.5 is invoked with the chroma picture sample array $recPicture_{Cb}$, the location of the chroma coding block ( xC/2, yC/2 ), the chroma location of the block ( $xD_k$, $yD_m$ ), a variable edgeType set equal to EDGE_HOR, the boundary filtering strength bS[ $xD_k$*2 ][ $yD_m$*2 ], and a variable cQpPicOffset set equal to pps_cb_qp_offset as inputs and the modified chroma picture sample array $recPicture_{Cb}$ as output.

b. The filtering process for chroma block edges as specified in subclause 8.7.2.4.5 is invoked with the chroma picture sample array $recPicture_{Cr}$, the location of the chroma coding block ( xC/2, yC/2 ), the chroma location of the block ( $xD_k$, $yD_m$ ), a variable edgeType set equal to EDGE_HOR, the boundary filtering strength bS[ $xD_k$*2 ][ $yD_m$*2 ], and a variable cQpPicOffset set equal to pps_cr_qp_offset as inputs and the modified chroma picture sample array $recPicture_{Cr}$ as output.

End Appendix A

APPENDIX B

ALTERNATIVE IMPLEMENTATION OF THE DEBLOCKING FILTER

8.7.2.1  Derivation process of transform block boundary

Inputs of this process are:

- a luma location ( xC, yC ) specifying the top-left sample of the current luma coding block relative to the top-left luma sample of the current picture,
- a luma location ( xB0, yB0 ) specifying the top-left sample of the current luma block relative to the top-left sample of the current luma coding block,
- a variable log2TrafoSize specifying the size of the current block,
- a variable trafoDepth,
- a variable filterEdgeFlag,
- a variable edgeType specifying whether a vertical (EDGE_VER) or a horizontal (EDGE_HOR) edge is filtered.

Output of this process is:

- a two-dimensional (nS)x(nS) array edgeFlags.

Depending on split_transform_flag[ xC + xB0 ][ yC + yB0 ][ trafoDepth ], the following applies:

- If split_transform_flag[ xC + xB0 ][ yC + yB0 ][ trafoDepth ] is equal to 1, the following ordered steps apply:

6. The variables xB1 and yB1 are derived as follows.
        - The variable xB1 is set equal to xB0 + ( ( 1 << log2TrafoSize ) >> 1 ).
        - The variable yB1 is set equal to yB0 + ( ( 1 << log2TrafoSize ) >> 1 ).

7. The deriviation process of transform block boundary as specified in this subclause is invoked with the luma location ( xC, yC ), the luma location ( xB0, yB0 ), the variable log2TrafoSize set equal to log2TrafoSize − 1, the variable trafoDepth1 set equal to trafoDepth + 1, the variable filterEdgeFlag and the variable edgeType as inputs and the output is the modified version of array edgeFlags.

8. The deriviation process of transform block boundary as specified in this subclause is invoked with the luma location ( xC, yC ), the luma location ( xB1, yB0 ), the variable log2TrafoSize set equal to log2TrafoSize − 1, the variable trafoDepth1 set equal to trafoDepth + 1, the variable filterEdgeFlag and the variable edgeType as inputs and the output is the modified version of array edgeFlags.

9. The deriviation process of transform block boundary as specified in this subclause is invoked with the luma location ( xC, yC ), the luma location ( xB0, yB1 ), the variable log2TrafoSize set equal to log2TrafoSize − 1, the variable trafoDepth1 set equal to trafoDepth + 1, the variable filterEdgeFlag and the variable edgeType as inputs and the output is the modified version of array edgeFlags.

10. The deriviation process of transform block boundary as specified in this subclause is invoked with the luma location ( xC, yC ), the luma location ( xB1, yB1 ), the variable log2TrafoSize set equal to log2TrafoSize − 1, the variable trafoDepth1 set equal to trafoDepth + 1, the variable filterEdgeFlag and the variable edgeType as inputs and the output is the modified version of array edgeFlags.

− Otherwise (split_transform_flag[ xC + xB0 ][ yC + yB0 ][ trafoDepth ] is equal to 0), the following applies:

- If edgeType is equal to EDGE_VER, the value of edgeFlags[ xB0 ][ yB0 + k ] for k = 0..( 1 << log2TrafoSize ) − 1 is derived as follows.

- If xB0 is equal to 0, edgeFlags[ xB0 ][ yB0 + k ] is set equal to filterEdgeFlag.

- Otherwise edgeFlags[ xB0 ][ yB0 + k ] is set equal to 1.

- Otherwise (edgeType is equal to EDGE_HOR), the value of edgeFlags[ xB0 + k ][ yB0 ] and edgeFlags[ xB0 + k ][ yB0 + ( ( 1 << log2TrafoSize ) >> 1 ) ] for k = 0..( 1 << log2TrafoSize ) − 1 are derived as follows.

- If yB0 is equal to 0, edgeFlags[ xB0 + k ][ yB0 ] is set equal to filterEdgeFlag.

- Otherwise edgeFlags[ xB0 + k ][ yB0 ] is set equal to 1.

- If ChromaArrayType is equal to 2, edgeFlags[ xB0 + k ][ yB0 + ( ( 1 << log2TrafoSize ) >> 1 ) ] is set equal to 2.

8.7.2.3 Derivation process of boundary filtering strength

Inputs of this process are:

− a luma picture sample array recPicture$_L$,

− a luma location ( xC, yC ) specifying the top-left sample of the current luma coding block relative to the top-left luma sample of the current picture, − a variable log2CbSize specifying the size of the current luma coding block, − a variable edgeType specifying whether a vertical (EDGE_VER) or a horizontal (EDGE_HOR) edge is filtered, − a two-dimensional array of size (nS)x(nS), edgeFlags.

Output of this process is:

− a two-dimensional array of size (nS)x(nS), bS specifying the boundary filtering strength.

The boundary filtering strength array bS for the current coding unit is derived as follows.

The variables xD$_i$, yD$_j$, xN and yN are derived as follows.

- If edgeType is equal to EDGE_VER, xD$_i$ is set equal to ( i << 3 ), yD$_j$ is set equal to ( j << 2 ), xN is set equal to (1 << ( log2CbSize − 3 )) − 1 and yN is set equal to (1 << ( log2CbSize − 2 )) − 1.

- Otherwise (edgeType is equal to EDGE_HOR), xD$_i$ is set equal to ( i << 2 ), yD$_j$ is set equal to ( j << 3 ), xN is set equal to (1 << ( log2CbSize − 2 )) − 1 and yN is set equal to (1 << ( log2CbSize − 3 )) − 1.

For xD$_i$ with i = 0..xN, the following applies.

For yD$_j$ with j = 0..yN, the following applies.

- If edgeFlags[ xD$_i$ ][ yD$_j$ ] is greater than 0, the sample values are derived as follows.

- If edgeType is equal to EDGE_VER, sample
    p$_0$ = recPicture$_L$[ xC + xD$_i$ − 1 ][ yC + yD$_j$ ] and
    q$_0$ = recPicture$_L$[ xC + xD$_i$ ][ yC + yD$_j$ ].

- Otherwise (edgeType is equal to EDGE_HOR), sample
    p$_0$ = recPicture$_L$[ xC + xD$_i$ ][ yC + yD$_j$ − 1 ] and
    q$_0$ = recPicture$_L$[ xC + xD$_i$ ][ yC + yD$_j$ ].

Depending on p$_0$ and q$_0$, the variable bS[ xD$_i$ ][ yD$_j$ ] is derived as follows.

- If the sample p$_0$ or q$_0$ is in the luma coding block of a coding unit coded with intra prediction mode, the following applies.

- If edgeFlags[ xD$_i$ ][ yD$_j$ ] is equal to 1, the variable bS[ xD$_i$ ][ yD$_j$ ] is set equal to 2.

- Otherwise (edgeFlags[ xD$_i$ ][ yD$_j$ ] is equal to 2), the variable bS[ xD$_i$ ][ yD$_j$ ] is set equal to 3.

- Otherwise, if the block edge is also a transform block edge and the sample p$_0$ or q$_0$ is in a luma transform block which contains one or more non-zero transform coefficient levels, the variable bS[ xD$_i$ ][ yD$_j$ ] is set equal to 1.

- Otherwise, the following applies.

- If one or more of the following conditions are true, the variable bS[ xD$_i$ ][ yD$_j$ ] is set equal to 1.

- For the prediction of the luma prediction block containing the sample p$_0$ different reference pictures or a different number of motion vectors are used than for the prediction of the luma prediction block containing the sample q$_0$.

NOTE 1 – The determination of whether the reference pictures used for the two luma prediction blocks are the same or different is based only on which pictures are referenced, without regard to whether a prediction is formed using an index into reference picture list 0 or an index into reference picture list 1, and also without regard to whether the index position within a reference picture list is different.

NOTE 2 – The number of motion vectors that are used for the prediction of a luma prediction block with top left luma sample covering ( xB, yB ), is equal to PredFlagL0[ xB, yB ] + PredFlagL1[ xB, yB ].

- One motion vector is used to predict the luma prediction block containing the sample p$_0$ and one motion vector is used to predict the luma prediction block containing the sample q$_0$ and the absolute difference between the horizontal or vertical component of the motion vectors used is greater than or equal to 4 in units of quarter luma samples.

- Two motion vectors and two different reference pictures are used to predict the luma prediction block containing the sample $p_0$ and two motion vectors for the same two reference pictures are used to predict the luma prediction block containing the sample $q_0$ and the absolute difference between the horizontal or vertical component of the two motion vectors used in the prediction of the two luma prediction blocks for the same reference picture is greater than or equal to 4 in units of quarter luma samples,

- Two motion vectors for the same reference picture are used to predict the luma prediction block containing the sample $p_0$ and two motion vectors for the same reference picture are used to predict the luma prediction block containing the sample $q_0$ and all of the following conditions are true:

- The absolute difference between the horizontal or vertical component of list 0 motion vectors used in the prediction of the two luma prediction bocks is greater than or equal to 4 in quarter luma samples or the absolute difference between the horizontal or vertical component of the list 1 motion vectors used in the prediction of the two luma prediction blocks is greater than or equal to 4 in units of quarter luma samples,

- The absolute difference between the horizontal or vertical component of list 0 motion vector used in the prediction of the luma prediction block containing the sample $p_0$ and the list 1 motion vector used in the prediction of the luma prediction block containing the sample $q_0$ is greater than or equal to 4 in units of quarter luma samples or the absolute difference between the horizontal or vertical component of the list 1 motion vector used in the prediction of the luma prediction block containing the sample $p_0$ and list 0 motion vector used in the prediction of the luma prediction block containing the sample $q_0$ is greater than or equal to 4 in units of quarter luma samples.

- Otherwise (none of the conditions above is true), the variable bS[ $xD_i$ ][ $yD_j$ ] is set equal to 0.

- Otherwise (edgeFlags[ $xD_i$ ][ $yD_j$ ] is equal to 0), the variable bS[ $xD_i$ ][ $yD_j$ ] is set equal to 0.

8.7.2.4.2               Horizontal edge filtering process
Inputs of this process are:

- picture sample arrays recPicture$_L$, recPicture$_{Cb}$ and recPicture$_{Cr}$.

- a luma location ( xC, yC ) specifying the top-left sample of the current luma coding block relative to the top-left luma sample of the current picture,

- a variable log2CbSize specifying the size of the current luma coding block,

- an array bS specifying the boundary filtering strength.

Outputs of this process are:

- the modified picture sample arrays recPicture$_L$, recPicture$_{Cb}$ and recPicture$_{Cr}$.

The filtering process for edges in the luma coding block of the current coding unit consists of the following ordered steps:

3. The variable nD is set equal to 1 << ( log2CbSize − 3 ).
4. For yD$_m$ set equal to m << 3, m = 0..nD − 1, the following applies.
   For xD$_k$ set equal to k << 2, k = 0..nD*2 − 1, the following applies.

- When bS[ xD$_k$ ][ yD$_m$ ] is greater than 0 and less than 3, the following ordered steps apply.

c. The decision process for luma block edges as specified in subclause 8.7.2.4.3 is invoked with the luma picture sample array recPicture$_L$, the location of the luma coding block ( xC, yC ), the luma location of the block ( xD$_k$, yD$_m$ ), a variable edgeType set equal to EDGE_HOR, and the boundary filtering strength bS[ xD$_k$ ][ yD$_m$ ] as inputs, the decisions dE, dEp, dEq, and the variables β, t$_C$ as outputs.

d. The filtering process for luma block edges as specified in subclause 8.7.2.4.4 is invoked with the luma picture sample array recPicture$_L$, the location of the luma coding block ( xC, yC ), the luma location of the block ( xD$_k$, yD$_m$ ), a variable edgeType set equal to EDGE_HOR, the decisions dEp, dEp, dEq, and the variables β, t$_C$ as inputs and the modified luma picture sample array recPicture$_L$ as output.

The filtering process for edges in the chroma coding blocks of current coding unit consists of the following ordered steps:

3. The variable nD is set equal to 1 << ( log2CbSize − 3 ).
4. For yD$_m$ set equal to m << 2, m = 0..nD − 1, the following applies.
   For xD$_k$ set equal to k << 2, k = 0..nD*2 − 1, the following applies.

- When bS[ xD$_k$*2 ][ yD$_m$*2 ] is greater than 1 and (( yD$_m$ >> 3 ) << 3) is equal to yD$_m$, the following ordered steps apply.

c. The filtering process for chroma block edges as specified in subclause 8.7.2.4.5 is invoked with the chroma picture sample array recPicture$_{Cb}$, the location of the chroma coding block ( xC/2, yC/2 ), the chroma location of the block ( xD$_k$, yD$_m$ ), a variable edgeType set equal to EDGE_HOR, the boundary filtering strength bS[ xD$_k$*2 ][ yD$_m$*2 ], and a variable cQpPicOffset set equal to pps_cb_qp_offset as inputs and the modified chroma picture sample array recPicture$_{Cb}$ as output.

d. The filtering process for chroma block edges as specified in subclause 8.7.2.4.5 is invoked with the chroma picture sample array recPicture$_{Cr}$, the location of the chroma coding block ( xC/2, yC/2 ), the chroma location of the block ( xD$_k$, yD$_m$ ), a variable edgeType set equal to EDGE_HOR, the boundary filtering strength bS[ xD$_k$*2 ][ yD$_m$*2 ], and a variable cQpPicOffset set equal to pps_cr_qp_offset as inputs and the modified chroma picture sample array recPicture$_{Cr}$ as output.

End Appendix B

APPENDIX C

ALTERNATIVE IMPLEMENTATION OF THE DEBLOCKING FILTER

8.7.2.2 Derivation process of transform block boundary

Inputs to this process are:

- a luma location ( xCb, yCb ) specifying the top-left sample of the current luma coding block relative to the top-left luma sample of the current picture,
- a luma location ( xB0, yB0 ) specifying the top-left sample of the current luma block relative to the top-left sample of the current luma coding block,
- a variable log2TrafoSize specifying the size of the current block,
- a variable trafoDepth,
- a variable filterEdgeFlag,
- a two-dimensional (nCbS)x(nCbS) array edgeFlags,
- a variable edgeType specifying whether a vertical (EDGE_VER) or a horizontal (EDGE_HOR) edge is filtered.

Output of this process is the modified two-dimensional (nCbS)x(nCbS) array edgeFlags.

Depending on the value of split_transform_flag[ xCb + xB0 ][ yCb + yB0 ][ trafoDepth ], the following applies:

- If split_transform_flag[ xCb + xB0 ][ yCb + yB0 ][ trafoDepth ] is equal to 1, the following ordered steps apply:

11. The variables xB1 and yB1 are derived as follows:
        ◆ The variable xB1 is set equal to xB0 + ( 1 << ( log2TrafoSize − 1 ) ).
        ◆ The variable yB1 is set equal to yB0 + ( 1 << ( log2TrafoSize − 1 ) ).

12. The derivation process of transform block boundary as specified in this subclause is invoked with the luma location ( xCb, yCb ), the luma location ( xB0, yB0 ), the variable log2TrafoSize set equal to log2TrafoSize − 1, the variable trafoDepth set equal to trafoDepth + 1, the variable filterEdgeFlag, the array edgeFlags, and the variable edgeType as inputs, and the output is the modified version of array edgeFlags.

13. The derivation process of transform block boundary as specified in this subclause is invoked with the luma location ( xCb, yCb ), the luma location ( xB1, yB0 ), the variable log2TrafoSize set equal to log2TrafoSize − 1, the variable trafoDepth set equal to trafoDepth + 1, the variable filterEdgeFlag, the array edgeFlags, and the variable edgeType as inputs, and the output is the modified version of array edgeFlags.

14. The derivation process of transform block boundary as specified in this subclause is invoked with the luma location ( xCb, yCb ), the luma location ( xB0, yB1 ), the variable log2TrafoSize set equal to log2TrafoSize − 1, the variable trafoDepth set equal to trafoDepth + 1, the variable filterEdgeFlag, the array edgeFlags, and the variable edgeType as inputs, and the output is the modified version of array edgeFlags.

15. The derivation process of transform block boundary as specified in this subclause is invoked with the luma location ( xCb, yCb ), the luma location ( xB1, yB1 ), the variable log2TrafoSize set equal to log2TrafoSize − 1, the variable trafoDepth set equal to trafoDepth + 1, the variable filterEdgeFlag, the array edgeFlags, and the variable edgeType as inputs, and the output is the modified version of array edgeFlags.

— Otherwise (split_transform_flag[ xCb + xB0 ][ yCb + yB0 ][ trafoDepth ] is equal to 0), the following applies:

- If edgeType is equal to EDGE_VER, the value of edgeFlags[ xB0 ][ yB0 + k ] for k = 0..( 1 << log2TrafoSize ) − 1 is derived as follows:
  - If xB0 is equal to 0, edgeFlags[ xB0 ][ yB0 + k ] is set equal to filterEdgeFlag.
  - Otherwise, edgeFlags[ xB0 ][ yB0 + k ] is set equal to 1.
- Otherwise (edgeType is equal to EDGE_HOR), the value of edgeFlags[ xB0 + k ][ yB0 ] and edgeFlags[ xB0 + k ][ yB0 + ( ( 1 << log2TrafoSize ) >> 1 ) ] for k = 0..( 1 << log2TrafoSize ) − 1 is-are derived as follows:
  - If yB0 is equal to 0, edgeFlags[ xB0 + k ][ yB0 ] is set equal to filterEdgeFlag.
  - Otherwise, edgeFlags[ xB0 + k ][ yB0 ] is set equal to 1.
  - If ChromaArrayType is equal to 2, edgeFlags[ xB0 + k ][ yB0 + ( ( 1 << log2TrafoSize ) >> 1 ) ] is set equal to 2.

8.7.2.4 Derivation process of boundary filtering strength

Inputs to this process are:

— a luma picture sample array $recPicture_L$,

— a luma location ( xCb, yCb ) specifying the top-left sample of the current luma coding block relative to the top-left luma sample of the current picture, — a variable log2CbSize specifying the size of the current luma coding block, — a variable edgeType specifying whether a vertical (EDGE_VER) or a horizontal (EDGE_HOR) edge is filtered, — a two-dimensional (nCbS)x(nCbS) array edgeFlags.

Output of this process is a two-dimensional (nCbS)x(nCbS) array bS specifying the boundary filtering strength.

The variables $xD_i$, $yD_j$, xN, and yN are derived as follows:

- If edgeType is equal to EDGE_VER, $xD_i$ is set equal to ( i << 3 ), $yD_j$ is set equal to ( j << 2 ), xN is set equal to ( 1 << ( log2CbSize − 3 ) ) − 1, and yN is set equal to ( 1 << ( log2CbSize − 2 ) ) − 1.

- Otherwise (edgeType is equal to EDGE_HOR), $xD_i$ is set equal to ( i << 2 ), $yD_j$ is set equal to ( j << 3 ), xN is set equal to ( 1 << ( log2CbSize − 2 ) ) − 1, and yN is set equal to ( 1 << ( log2CbSize − 3 ) ) − 1.

For $xD_i$ with i = 0..xN and $yD_j$ with j = 0..yN, the following applies:

- If edgeFlags[ $xD_i$ ][ $yD_j$ ] is equal to 0, the variable bS[ $xD_i$ ][ $yD_j$ ] is set equal to 0.

- Otherwise (edgeFlags[ $xD_i$ ][ $yD_j$ ] is greater than 0 ~~equal to 1~~), the following applies:

- The sample values $p_0$ and $q_0$ are derived as follows:

- If edgeType is equal to EDGE_VER, $p_0$ is set equal to recPicture$_L$[ xCb + $xD_i$ − 1 ][ yCb + $yD_j$ ] and $q_0$ is set equal to recPicture$_L$[ xCb + $xD_i$ ][ yCb + $yD_j$ ].

- Otherwise (edgeType is equal to EDGE_HOR), $p_0$ is set equal to recPicture$_L$[ xCb + $xD_i$ ][ yCb + $yD_j$ − 1 ] and $q_0$ is set equal to recPicture$_L$[ xCb + $xD_i$ ][ yCb + $yD_j$ ].

- The variable bS[ $xD_i$ ][ $yD_j$ ] is derived as follows:

- If the sample $p_0$ or $q_0$ is in the luma coding block of a coding unit coded with intra prediction mode, the following applies.

- If edgeFlags[ $xD_i$ ][ $yD_j$ ] is equal to 1, bS[ $xD_i$ ][ $yD_j$ ] is set equal to 2.

- Otherwise (edgeFlags[ $xD_i$ ][ $yD_j$ ] is equal to 2), the variable bS[ $xD_i$ ][ $yD_j$ ] is set equal to 3.

- Otherwise, if the block edge is also a transform block edge and the sample $p_0$ or $q_0$ is in a luma transform block which contains one or more non-zero transform coefficient levels, bS[ $xD_i$ ][ $yD_j$ ] is set equal to 1.

- Otherwise, if edgeFlags[ $xD_i$ ][ $yD_j$ ] is equal to 1 and one or more of the following conditions are true, bS[ $xD_i$ ][ $yD_j$ ] is set equal to 1:

- For the prediction of the luma prediction block containing the sample $p_0$ different reference pictures or a different number of motion vectors are used than for the prediction of the luma prediction block containing the sample $q_0$.

NOTE 1 – The determination of whether the reference pictures used for the two luma prediction blocks are the same or different is based only on which pictures are referenced, without regard to whether a prediction is formed using an index into reference picture list 0 or an index into reference picture list 1, and also without regard to whether the index position within a reference picture list is different.

NOTE 2 – The number of motion vectors that are used for the prediction of a luma prediction block with top-left luma sample covering ( xPb, yPb ), is equal to PredFlagL0[ xPb ][ yPb ] + PredFlagL1[ xPb ][ yPb ].

- One motion vector is used to predict the luma prediction block containing the sample $p_0$ and one motion vector is used to predict the luma prediction block containing the sample $q_0$, and the absolute difference between the horizontal or vertical component of the motion vectors used is greater than or equal to 4 in units of quarter luma samples.

- Two motion vectors and two different reference pictures are used to predict the luma prediction block containing the sample $p_0$, two motion vectors for the same two reference pictures are used to predict the luma prediction block containing the sample $q_0$, and the absolute difference between the horizontal or vertical component of the two motion vectors used in the prediction of the two luma prediction blocks for the same reference picture is greater than or equal to 4 in units of quarter luma samples.

- Two motion vectors for the same reference picture are used to predict the luma prediction block containing the sample $p_0$, two motion vectors for the same reference picture are used to predict the luma prediction block containing the sample $q_0$, and both of the following conditions are true:

- The absolute difference between the horizontal or vertical component of list 0 motion vectors used in the prediction of the two luma prediction blocks is greater than or equal to 4 in quarter luma samples, or the absolute difference between the horizontal or vertical component of the list 1 motion vectors used in the prediction of the two luma prediction blocks is greater than or equal to 4 in units of quarter luma samples.

- The absolute difference between the horizontal or vertical component of list 0 motion vector used in the prediction of the luma prediction block containing the sample $p_0$ and the list 1 motion vector used in the prediction of the luma prediction block containing the sample $q_0$ is greater than or equal to 4 in units of quarter luma samples, or the absolute difference between the horizontal or vertical component of the list 1 motion vector used in the prediction of the luma prediction block containing the sample $p_0$ and list 0 motion vector used in the prediction of the luma prediction block containing the sample $q_0$ is greater than or equal to 4 in units of quarter luma samples.

- Otherwise, the variable bS[ $xD_i$ ][ $yD_j$ ] is set equal to 0.

8.7.2.5.2  Horizontal edge filtering process

Inputs to this process are:

- the picture sample array recPicture$_L$, and when ChromaArrayType is not equal to 0, the arrays recPicture$_{Cb}$, and recPicture$_{Cr}$,

- a luma location ( xCb, yCb ) specifying the top-left sample of the current luma coding block relative to the top-left luma sample of the current picture,

- a variable log2CbSize specifying the size of the current luma coding block,

- an array bS specifying the boundary filtering strength.

Outputs of this process are the modified picture sample array recPicture$_L$, and when ChromaArrayType is not equal to 0, the arrays recPicture$_{Cb}$, and recPicture$_{Cr}$.

The filtering process for edges in the luma coding block of the current coding unit consists of the following ordered steps:

5. The variable nD is set equal to 1 << ( log2CbSize − 3 ).
6. For yD$_m$ equal to m << 3 with m = 0..nD − 1, and xD$_k$ equal to k << 2 with k = 0..nD * 2 − 1, the following applies:
   - When bS[ xD$_k$ ][ yD$_m$ ] is greater than 0 and less than 3, the following ordered steps apply:
     e. The decision process for luma block edges as specified in subclause 8.7.2.5.3 is invoked with the luma picture sample array recPicture$_L$, the location of the luma coding block ( xCb, yCb ), the luma location of the block ( xD$_k$, yD$_m$ ), a variable edgeType set equal to EDGE_HOR, and the boundary filtering strength bS[ xD$_k$ ][ yD$_m$ ] as inputs, and the decisions dE, dEp, and dEq, and the variables β and t$_C$ as outputs.
     f. The filtering process for luma block edges as specified in subclause 8.7.2.5.4 is invoked with the luma picture sample array recPicture$_L$, the location of the luma coding block ( xCb, yCb ), the luma location of the block ( xD$_k$, yD$_m$ ), a variable edgeType set equal to EDGE_HOR, the decisions dEp, dEp, and dEq, and the variables β and t$_C$ as inputs, and the modified luma picture sample array recPicture$_L$ as output.

When ChromaArrayType is not equal to 0, the following applies.

The filtering process for edges in the chroma coding blocks of current coding unit consists of the following ordered steps:

5. The variable nD is set equal to 1 << ( log2CbSize − 3 ).
7. The variable EdgeSpacing is set equal to 8 / SubHeightC.
6. The variable EdgeSections is set equal to nD * ( 2 / SubWidthC ).
7. For yD$_m$ equal to m * EdgeSpacing with m = 0..nD − 1 and xD$_k$ equal to k << 2 with k = 0..EdgeSections − 1, the following applies:
   - When bS[ xD$_k$ * SubWidthC ][ yD$_m$ * SubHeightC ] is equal to 2 and ( ( ( yCb / SubHeightC + yD$_m$ ) >> 3 ) << 3 ) is equal to yCb / SubHeightC + yD$_m$, the following ordered steps apply:
     a. The filtering process for chroma block edges as specified in subclause 8.7.2.5.5 is invoked with the chroma picture sample array recPicture$_{Cb}$, the location of the chroma coding block ( xCb / SubWidthC, yCb / SubHeightC ), the chroma location of the block ( xD$_k$, yD$_m$ ), a variable edgeType set equal to EDGE_HOR, and a variable cQpPicOffset set equal to pps_cb_qp_offset as inputs, and the modified chroma picture sample array recPicture$_{Cb}$ as output.

The filtering process for chroma block edges as specified in subclause 8.7.2.5.5 is invoked with the chroma picture sample array recPicture$_{Cr}$, the location of the chroma coding block ( xCb / SubWidthC, yCb / SubHeightC ), the chroma location of the block ( xD$_k$, yD$_m$ ), a variable edgeType set equal to EDGE_HOR, and a variable cQpPicOffset set equal to pps_cr_qp_offset as inputs, and the modified chroma picture sample array recPicture$_{Cr}$ as output.

The claims defining the invention are as follows:

1. A method of de-blocking video data, the method comprising:
   receiving the video data encoding colour channels in a 4:2:2 format, the video data being encoded in a quad-tree;
   generating a plurality of transform units for one chroma channel of the colour channels, each of the transform units including at least one transform;
   determining a chroma boundary distance representing a distance from a chroma edge of one of the transform units of the chroma channel to a boundary of an inferred split of a transform of the transform unit, the inferred split dividing a rectangular chroma region of the transform unit;
   determining an edge flag for the transform unit, the edge flag indicating the determined chroma boundary distance; and
   applying de-blocking to the transform units of the video data according to the determined edge flag.

2. A method according to claim 1, wherein the chroma edge is for the chroma channel.

3. A method according to claim 1, wherein the distance from the chroma edge is relative to a level in a hierarchy of the transform unit.

4. A system for de-blocking video data, the system comprising:
   a memory for storing data and a computer program;
   a processor coupled to the memory for executing said computer program, said computer program comprising instructions for:
   receiving the video data encoding colour channels in a 4:2:2 format, the video data being encoded in a quad-tree;
   generating a plurality of transform units for one chroma channel of the colour channels, each of the transform units including at least one transform;
   determining a chroma boundary distance representing a distance from a chroma edge of one of the transform units of the chroma channel to a boundary of an inferred split of a transform of the transform unit, the inferred split dividing a rectangular chroma region of the transform unit;
   determining an edge flag for the transform unit, the edge flag indicating the determined chroma boundary distance; and
   applying de-blocking to the transform units of the video data according to the determined edge flag.

5. An apparatus for de-blocking video data, the apparatus comprising:
   means for receiving the video data encoding colour channels in a 4:2:2 format, the video data being encoded in a quad-tree;
   means for generating a plurality of transform units for one chroma channel of the colour channels, each of the transform units including at least one transform;
   means for determining a chroma boundary distance representing a distance from a chroma edge of one of the transform units of the chroma channel to a boundary of an inferred split of a transform of the transform unit, the inferred split dividing a rectangular chroma region of the transform unit;
   means for determining an edge flag for the transform unit, the edge flag indicating the determined chroma boundary distance; and
   means for applying de-blocking to the transform units of the video data according to the determined edge flag.

6. A non-transitory computer readable medium comprising a computer program for de-blocking video data, the program comprising:
   code for receiving the video data encoding colour channels in a 4:2:2 format, the video data being encoded in a quad-tree;
   code for generating a plurality of transform units for one chroma channel of the colour channels, each of the transform units including at least one transform;
   code for determining a chroma boundary distance representing a distance from an edge of one of the transform units of the chroma channel to a boundary of an inferred split of a transform of the transform unit, the inferred split dividing a rectangular chroma region of the transform unit;
   code for determining an edge flag for the transform unit, the edge flag indicating the determined chroma boundary distance; and
   code for applying de-blocking to the transform units of the video data according to the determined edge flag.

7. A method of de-blocking video data, the method comprising:
   traversing a quad-tree hierarchy defined by one or more split coding unit flags or split transform flags;
   determining a size of a transform in a chroma colour channel of the traversed quad-tree hierarchy, the size being based on a chroma boundary distance representing a distance from an edge of the transform unit to a boundary of an inferred split of the transform, the inferred split dividing a rectangular chroma region of the transform unit;
   determining an edge flag array location relative to a current location based on the determined size of the transform in the chroma colour channel;
   storing an edge flag value at the determined edge flag array location, the edge flag value signalling that only a chroma edge is deblocked; and
   applying de-blocking to only the chroma edge according to the edge flag value.

8. An apparatus for de-blocking video data, the apparatus comprising:
   means for traversing a quad-tree hierarchy defined by one or more split coding unit flags or split transform flags;
   means for determining a size of a transform in a chroma colour channel of the traversed quad-tree hierarchy, the size being based on a chroma boundary distance representing a distance from an edge of the transform unit to a boundary of an inferred split of the transform, the inferred split dividing a rectangular chroma region of the transform unit;
   means for determining an edge flag array location relative to a current location based on the determined size of the transform in the chroma colour channel;
   means for storing an edge flag value at the determined edge flag array location, the edge flag value signalling that only a chroma edge is deblocked; and
   means for applying de-blocking to only the chroma edge according to the edge flag value.

9. A system for de-blocking video data, the system comprising:
   a memory for storing data and a computer program;
   a processor coupled to the memory for executing the computer program, the computer program comprising instructions for:
   traversing a quad-tree hierarchy defined by one or more split coding unit flags or split transform flags;

determining a size of a transform in a chroma colour channel of the traversed quad-tree hierarchy, the size being based on a chroma boundary distance representing a distance from an edge of the transform unit to a boundary of an inferred split of the transform, the inferred split dividing a rectangular chroma region of the transform unit;

determining an edge flag array location relative to a current location based on the determined size of the transform in the chroma colour channel;

storing an edge flag value at the determined edge flag array location, the edge flag value signalling that only a chroma edge is deblocked; and applying de-blocking to only the chroma edge according to the edge flag value.

10. A non-transitory computer readable medium having a computer program stored thereon for de-blocking video data, the program comprising:

code for traversing a quad-tree hierarchy defined by one or more split coding unit flags or split transform flags;

code for determining a size of a transform in a chroma colour channel of the traversed quad-tree hierarchy, the size being based on a chroma boundary distance representing a distance from an edge of the transform unit to a boundary of an inferred split of the transform, the inferred split dividing a rectangular chroma region of the transform unit;

code for determining an edge flag array location relative to a current location based on the determined size of the transform in the chroma colour channel;

code for storing an edge flag value at the determined edge flag array location, the edge flag value signalling that only a chroma edge is deblocked; and code for applying de-blocking to only the chroma edge according to the edge flag value.

* * * * *